(12) United States Patent
Ishigaki

(10) Patent No.: US 11,420,503 B2
(45) Date of Patent: Aug. 23, 2022

(54) SLIDING-DOOR DRIVE DEVICE

(71) Applicant: MITSUI KINZOKU ACT CORPORATION, Kanagawa (JP)

(72) Inventor: Hiroshi Ishigaki, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 918 days.

(21) Appl. No.: 16/311,107

(22) PCT Filed: Mar. 16, 2018

(86) PCT No.: PCT/JP2018/010566
§ 371 (c)(1),
(2) Date: Dec. 18, 2018

(87) PCT Pub. No.: WO2019/049402
PCT Pub. Date: Mar. 14, 2019

(65) Prior Publication Data
US 2021/0213811 A1 Jul. 15, 2021

(30) Foreign Application Priority Data

Sep. 6, 2017 (JP) .............................. JP2017-171271

(51) Int. Cl.
*B60J 5/06* (2006.01)
*E05F 15/646* (2015.01)
(Continued)

(52) U.S. Cl.
CPC ............... *B60J 5/06* (2013.01); *E05F 15/646* (2015.01); *E05D 15/1047* (2013.01);
(Continued)

(58) Field of Classification Search
CPC .................................. E05F 15/646; B60J 5/06
(Continued)

(56) References Cited

U.S. PATENT DOCUMENTS 5,069,502 A 12/1991 Sekine et al.
6,270,149 B1 * 8/2001 Fukumoto ............. E05F 15/638
303/6.1
(Continued)

FOREIGN PATENT DOCUMENTS

CN 104220285 A 12/2014
FR 2847612 A1 5/2004
(Continued)

OTHER PUBLICATIONS

International Search Report dated May 29, 2018 issued in corresponding International Patent Application No. PCT/JP2018/010566.
(Continued)

*Primary Examiner* — D Glenn Dayoan
*Assistant Examiner* — Sunsurraye Westbrook
(74) *Attorney, Agent, or Firm* — McDermott Will & Emery LLP

(57) ABSTRACT

A sliding-door drive device includes: a motor; a speed reducing mechanism reducing rotation of the motor; opening and closing cables having respective one ends secured to a sliding door of a vehicle; an opening drum, having the opening cable wound therearound, to be rotated by the motor through the speed reducing mechanism; and a closing drum, having the closing cable wound therearound, to be rotated by the motor through the speed reducing mechanism. Further, rotation axes of the motor, the opening drum, and the closing drum are parallel, and the opening drum and the closing drum are arranged parallel in radial directions thereof.

10 Claims, 17 Drawing Sheets

(51) Int. Cl.
*E05D 15/10* (2006.01)
*F16H 1/06* (2006.01)

(52) U.S. Cl.
CPC ..... *E05Y 2201/43* (2013.01); *E05Y 2201/654* (2013.01); *E05Y 2201/664* (2013.01); *E05Y 2201/684* (2013.01); *E05Y 2900/531* (2013.01); *F16H 1/06* (2013.01)

(58) Field of Classification Search
USPC ......... 296/223, 216.02, 146.16, 155; 49/208, 49/209, 358, 360
See application file for complete search history.

(56) References Cited

U.S. PATENT DOCUMENTS

| | | | | |
|---|---|---|---|---|
| 6,783,165 | B2* | 8/2004 | Schmidt | B60R 5/047 296/24.45 |
| 7,774,985 | B2 | 8/2010 | Miyagawa et al. | |
| 8,857,104 | B2* | 10/2014 | Ishigaki | E05F 15/646 49/360 |
| 9,957,746 | B2 | 5/2018 | Kaihatsu et al. | |
| 2005/0055883 | A1* | 3/2005 | Sato | E05F 15/646 49/360 |
| 2006/0112643 | A1 | 6/2006 | Yokomori et al. | |
| 2007/0084123 | A1 | 4/2007 | Yokomori et al. | |
| 2007/0163179 | A1 | 7/2007 | Fukumura et al. | |
| 2009/0173011 | A1 | 7/2009 | Kita et al. | |

FOREIGN PATENT DOCUMENTS

| | | |
|---|---|---|
| GB | 2309500 A | 7/1997 |
| JP | 3324968 B2 | 9/2002 |
| JP | 2010-048051 A | 3/2010 |
| JP | 4746400 B2 | 8/2011 |
| JP | 4806310 B2 | 11/2011 |
| JP | 2015-142410 A | 8/2015 |
| WO | 2007/026724 A1 | 3/2007 |
| WO | 2015/115358 A1 | 8/2015 |

OTHER PUBLICATIONS

Chinese Office Action issued in corresponding Chinese Patent Application No. 201880002577.2, dated Apr. 15, 2020, with English translation.

* cited by examiner

SLIDING-DOOR DRIVE DEVICE

CROSS REFERENCE

This application is the U.S. National Phase under 35 U.S.C. § 371 of International Application No. PCT/JP2018/010566, filed on Mar. 16, 2018, which claims the benefit of Japanese Application No. 2017-171271, filed on Sep. 6, 2017, the entire contents of each are hereby incorporated by reference.

FIELD

The present invention relates to a sliding-door drive device for opening and closing a sliding door of a vehicle.

BACKGROUND

Cars with a one-box design, wagons, and vans are often provided with a slidable-type sliding door as a rear door, and in recent years, there have been measures taken to automate its opening/closing operation. The typical configuration of a vehicular-door opening/closing device for automatically opening and closing a sliding door includes: a rail member provided along a body side surface; a cable that is driven along the rail member to open and close the door; and a sliding-door drive device for winding the cable. Typically, the sliding-door drive device includes: a motor that is a power source; a speed reducing mechanism that reduces the rotation of the motor; and a rotary drum that is rotated by the speed reducing mechanism to wind and unwind the cable. Furthermore, the sliding-door drive device is often provided with a clutch for switching between manual and automatic opening/closing of the sliding door.

For stable opening/closing operation, the sliding door is supported by three points, an upper rail, a center rail, and a lower rail, and the sliding-door drive device is often provided in the center rail among the three rails. In this case, the sliding-door drive device is fixed at the indoor side of the quarter panel of a vehicle.

Furthermore, there is a demand for a wider interior width of the room inside a vehicle even if only slightly. When a sliding-door drive device is provided in the center rail, the interior width is affected by the width of a housing section of the sliding-door drive device in the quarter panel. If the vehicle width is not changed, there is a need to ensure a wider housing section as the sliding-door drive device is thicker, which results in a narrower interior width. Furthermore, the area where the center rail is installed is equivalent to the approximate height from the waist to the elbow of an occupant who is sitting, when viewed from the in-vehicle space, and it is an area for which there is a high demand to increase the interior width. Therefore, there have been developments to partially omit a motor, a drum, and a clutch that are the principal elements that define the thickness of the sliding-door drive device or reduce the thickness as much as possible.

Furthermore, when a sliding-door drive device is installed in a vehicle, a cable to be connected to the sliding door needs to have a certain degree of allowance, and after it is fixed to the sliding door, looseness of the cable is removed by a tensioner.

According to Patent Literature 1, a low-rotation high-output motor is used so that a clutch is omitted and a reduction in thickness is achieved. In Patent Literature 1, a configuration is such that an adjustment drum for initial winding to remove looseness of a cable is operated with a knob. According to Patent Literature 2, a configuration is such that a knob portion of a stopper is operated to remove looseness of a cable. FIG. 4 in Patent Literature 3 discloses that an opening drum with an opening cable wound around and a closing drum with a closing cable wound around are arranged parallel around the same axis to reduce the size.

Furthermore, FIG. 17 schematically illustrates a motor unit according to a related-art technology disclosed in Patent Literature 4. Specifically, each of an opening cable 501 for opening the sliding door and a closing cable 502 for closing the sliding door is wound around a drum 503. The drum 503 is rotated by an undepicted motor. The opening cable 501 is given tension by a tension pulley 505 elastically biased by a spring 504, and it is pulled out by being bent in an obliquely right direction. Similarly, the closing cable 502 is given tension by a tension pulley 507 elastically biased by a spring 506, and it is pulled out by being bent in an obliquely left direction. Patent Literature 4 discloses an example where a speed reducing mechanism uses a planet gear mechanism. In Patent Literature 4, a stopper is provided to properly keep the tension of a cable when a drive unit is attached to a vehicle.

CITATION LIST

Patent Literature

Patent Literature 1: Japanese Patent No. 3324968
Patent Literature 2: Japanese Patent No. 4806310
Patent Literature 3: Japanese Patent No. 4746400
Patent Literature 4: Japanese Laid-open Patent Publication No. 2015-142410

SUMMARY

Technical Problem

According to the inventions disclosed in Patent Literature 1, Patent Literature 2, and Patent Literature 4, a stopper or a knob for removing looseness of a cable protrudes to the indoor side of a vehicle, and accordingly the sliding-door drive device is thick. According to the invention disclosed in Patent Literature 3, as an opening drum and a closing drum are serially arranged in an axial direction, a reduction in thickness is not sufficiently achieved.

Furthermore, as illustrated in FIG. 17, in the motor unit disclosed in Patent Literature 4, as the opening cable 501 and the closing cable 502 are guided by the tension pulleys 505, 507, the ends of winding of the drum 503 are located on both sides on the right and left, and at least the range of approximately 180° indicated by an arrow 508 is not used for winding of the opening cable 501 and the closing cable 502 on a constant basis. Therefore, accordingly, the drum 503 is wastefully thick in an axial direction. Furthermore, as there are the tension pulleys 505, 507 and the springs 504, 506, there is accordingly an increase in the number of components, weight, and space needed. As the tension pulleys 505, 507 have a relatively small diameter, a bending load repeatedly applied to the opening cable 501 and the closing cable 502 is relatively high.

The present invention has been made in consideration of the above-described problem, and it has an object to provide a sliding-door drive device with a further reduced thickness.

Solution to Problem

To resolve the above problem and attain the object, a sliding-door drive device according to the present invention includes: a motor; a speed reducing mechanism reducing rotation of the motor; opening and closing cables having respective one ends secured to a sliding door of a vehicle; an opening drum, having the opening cable wound therearound, to be rotated by the motor through the speed reducing mechanism; and a closing drum, having the closing cable wound therearound, to be rotated by the motor through the speed reducing mechanism. Further, the rotation axes of the motor, the opening drum, and the closing drum are parallel, and the opening drum and the closing drum are arranged parallel in radial directions.

With such parallel arrangements, there is no waste in the winding range of the opening cable and the closing cable around the opening drum and the closing drum, and accordingly the axial-direction lengths of the opening drum and the closing drum are reduced, and the entire thickness is also reduced.

The sliding-door drive device may include: a housing to house the speed reducing mechanism, the opening drum, and the closing drum. Further, an Electronic Control Unit (ECU) including a control circuit for the motor is integrally arranged with the motor and the housing, the ECU is provided such that at least a part thereof is overlapped with the motor when viewed in an axial direction of the rotation axes, and a width of the housing in the axial direction of the rotation axes is less than a width from an outer end surface of the ECU to an outer end surface of the motor.

An end surface of the ECU and an end surface of the housing may be disposed on an identical plane at one end in the axial direction of the rotation axes, and an end surface of the motor and an end surface of the housing are on an identical plane at other end. Thus, there is no unnecessary concavity and convexity left on both side surfaces, and an efficient use of the spaces is achieved.

The width in the axial direction of the rotation axes may be 45 to 59 mm.

The motor is of a brushless type and may have a flat shape where a ratio of a diameter/an axial-direction thickness is 4.45 to 4.70. Brushless type motors are preferred in terms of service lifetime, EMC noise, noises, heat release performance and the like, and furthermore they are superior in stopping retention performance; thus, clutches are not necessary, and a reduction in thickness/size is achieved. Brushless type motors may have a flat shape, and a reduction in the thickness may be achieved by setting the ratio of the diameter/the axial-direction thickness to be 4.45 to 4.70.

The speed reducing mechanism may include a first-stage speed reducing unit and a second-stage speed reducing unit. The first-stage speed reducing unit includes a first input-side gear that is an external gear provided on an output shaft of the motor; and a first output-side gear that is an external gear to be engaged with the first input-side gear. The second-stage speed reducing unit includes a second input-side gear that is an external gear being integral and coaxial with the first output-side gear; and an opening second output-side gear and a closing second output-side gear that are external gears each being engaged with the second input-side gear. The output shaft and the first input-side gear protrude from the motor in a first direction, the second input-side gear is provided in a second direction opposite to the first direction with respect to the first output-side gear, the opening drum is provided on a side in the second direction and being coaxial to the opening second output-side gear. The closing drum is provided on a side in the second direction and being coaxial with the closing second output-side gear.

Due to the speed reduction at two stages by using the first-stage speed reducing unit and the second-stage speed reducing unit, a sufficient speed reduction ratio is obtained. Furthermore, the output axis of the motor is traveled in the first direction to be transmitted to the first input-side gear and the first output-side gear and then is conversely traveled in the second direction to be transmitted to the second input-side gear. Furthermore, it is traveled in the second direction through the opening second output-side gear and the closing second output-side gear to be transmitted to the opening drum and the closing drum. In this way, power is not transmitted only in any one direction along the axial direction for serial transmission, but it is transmitted by return from the first direction to the second direction based on the characteristics of external-type gears with the parallel axes configuration, and accordingly the entire may be compact and reduced in thickness.

The first-stage speed reducing unit and the second-stage speed reducing unit may have an identical speed reduction ratio. In this way, with the same speed reduction ratio, the balance of the speed reduction between the first-stage speed reducing unit and the second-stage speed reducing unit is improved. Furthermore, there is no situation in which only any one of them is larger, and the size may be reduced as a whole.

When viewed in the axial direction of the rotation axes, a shaft center of the first output-side gear and a shaft center of the second input-side gear may be provided at a circumcenter position of a triangle that has three vertices at a shaft center of the first input-side gear, a shaft center of the opening second output-side gear, and a shaft center of the closing second output-side gear. With this arrangement, the configuration may be compact in a balanced manner.

The ECU controlling the motor may be provided on a side in the first direction with respect to the motor. Sine only a part of the first input-side gear and the first output-side gear, exists on the side in the first direction when viewed from the motor, when the ECU is provided in this area, spaces may be efficiently used, and a reduction in thickness may be achieved.

The first input-side gear may be made of a copper-iron based sintered material, and the first output-side gear and the second input-side gear may be made of a resin material. Since the first input-side gear is made of a copper-iron based sintered material, it can be ensured that output of the motor is transmitted, and a longer service lifetime may be obtained. Furthermore, as the first output-side gear and the second input-side gear are made of a resin material, a reduction in weight and costs may be achieved. Sintered material and resin material facilitate formation of gear shape.

Advantageous Effects of Invention

In the sliding-door drive device according to the present invention, the opening drum and the closing drum are arranged parallel in radial directions. With this parallel arrangement, there is no waste in the winding range of the opening cable and the closing cable around the opening drum and the closing drum, and accordingly the axial-direction lengths of the opening drum and the closing drum are reduced, and the thickness is reduced in whole.

DESCRIPTION OF EMBODIMENTS

With reference to the drawings, a detailed explanation is given below of an embodiment of a sliding-door drive device according to the present invention. Note that the present invention is not limited to the embodiment.

Figure 1:
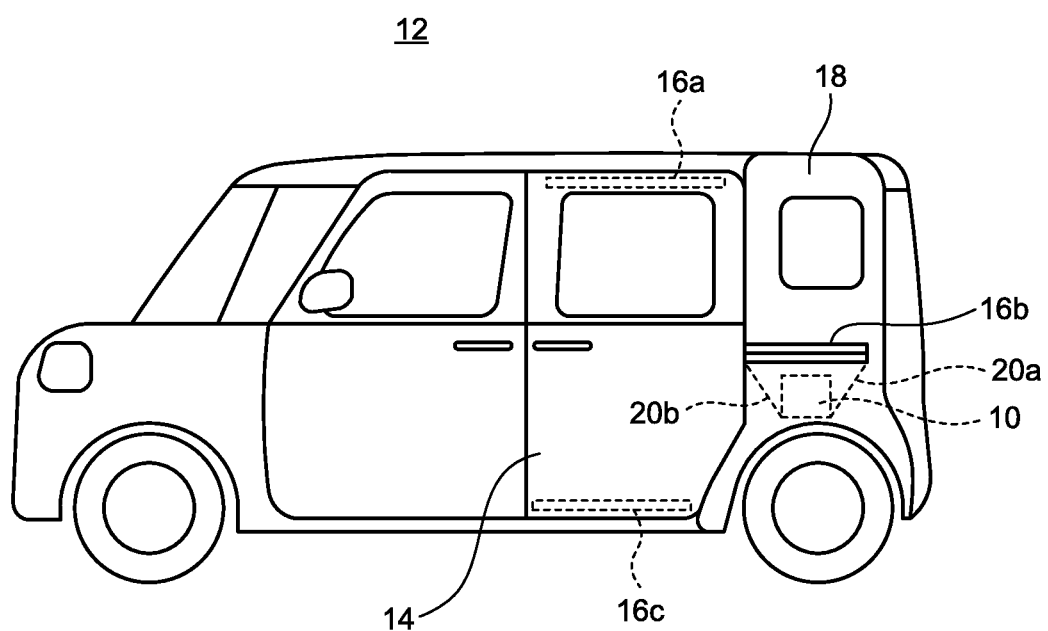
FIG. 1 is a side view of a vehicle in which a sliding-door drive device according to the present embodiment is installed.
Figure 2:
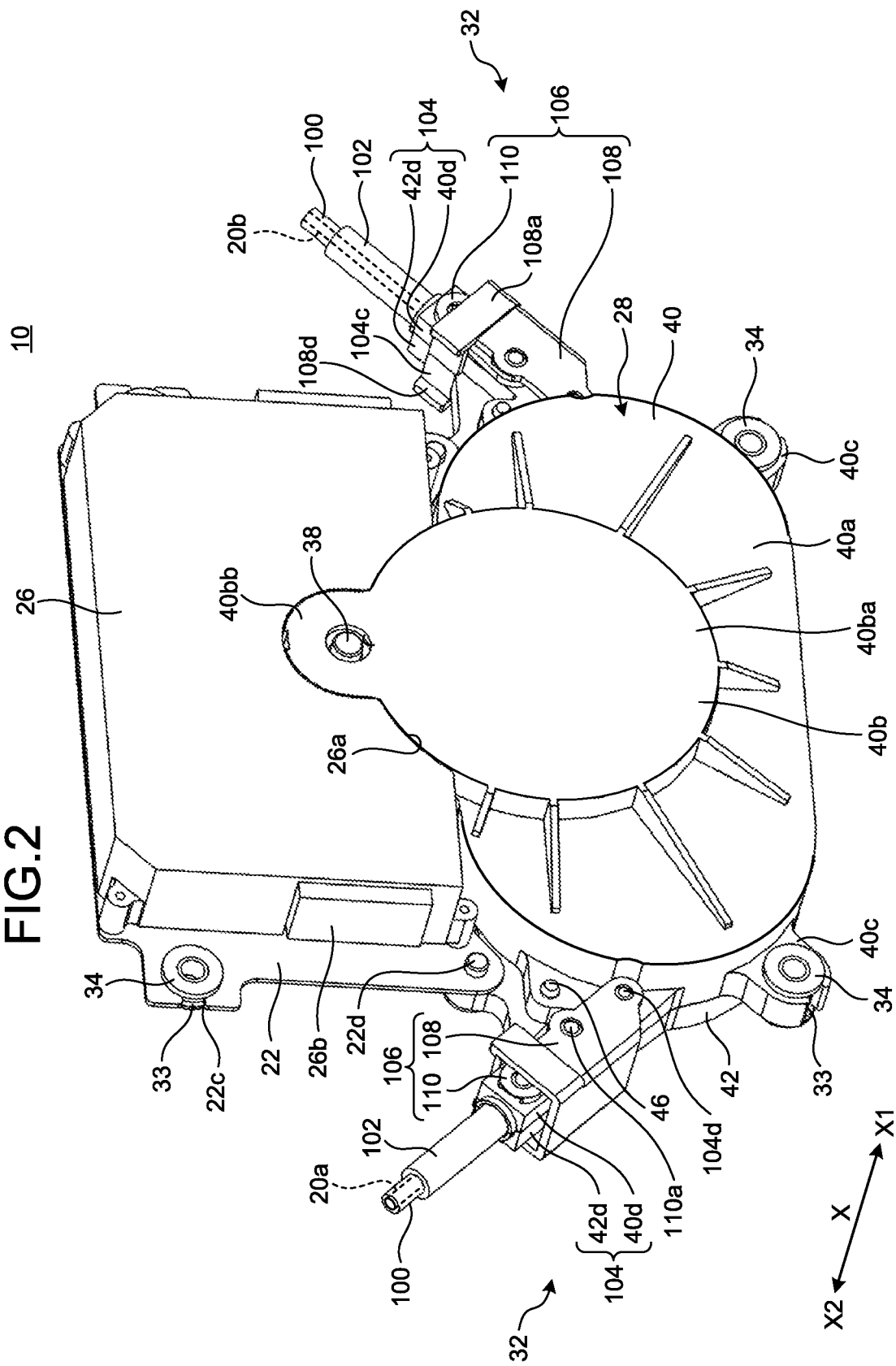
FIG. 2 is a perspective view of the sliding-door drive device when viewed obliquely from front.

As illustrated in FIG. 1, a sliding-door drive device 10 according to the present embodiment is installed in a vehicle 12, and it automatically opens and closes a rear door (sliding door) 14.

The door 14 is a sliding door, and it is opened and closed in a stable manner by being supported at three points by an upper rail 16a, a center rail 16b, and a lower rail 16c. The center rail 16b, included in them, is provided in substantially the middle of the height of a quarter panel 18.

Each end of an opening cable 20a and a closing cable 20b is secured to a support frame provided in the door 14. The support frame includes a drive roller that is rotated in the center rail 16b. The opening cable 20a and the closing cable 20b are, for example, stainless-steel stranded wires. The opening cable 20a and the closing cable 20b are connected to the sliding-door drive device 10. The sliding-door drive device 10 rolls or unrolls the opening cable 20a and the closing cable 20b so as to open or close the door 14. The vehicle 12 is provided with a holding unit that holds the door 14 at a fully open position or a fully close position.

The sliding-door drive device 10 is secured to the quarter panel 18 at a position close to the center rail 16b on the indoor side. This position is sometimes equivalent to the approximate height from the waist to the elbow of the occupant who is sitting when viewed from the in-vehicle space, and it is an area for which there is high demand to increase an interior width.

Figure 3:
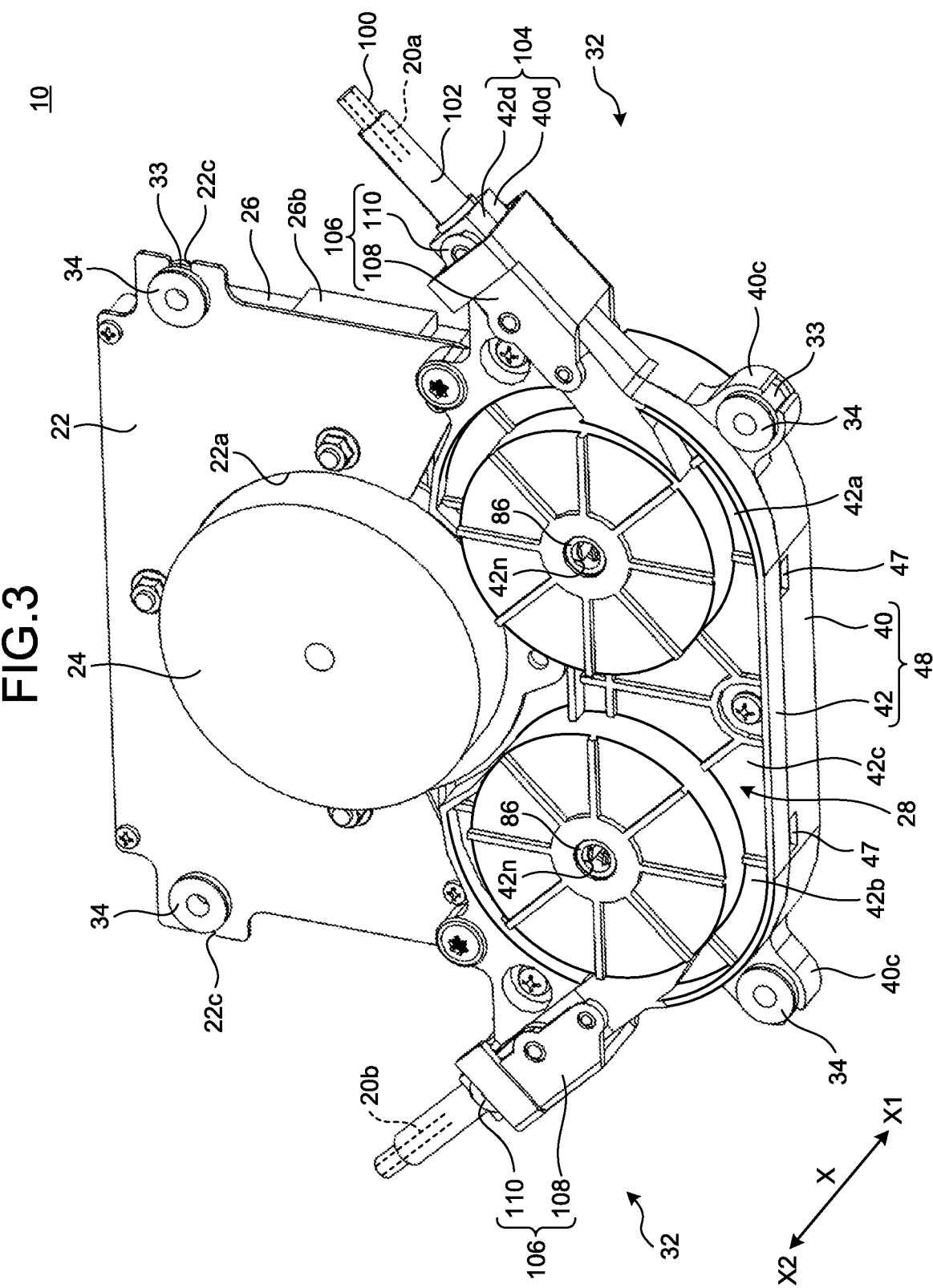
FIG. 3 is a perspective view of the sliding-door drive device when viewed obliquely from back.
Figure 4:
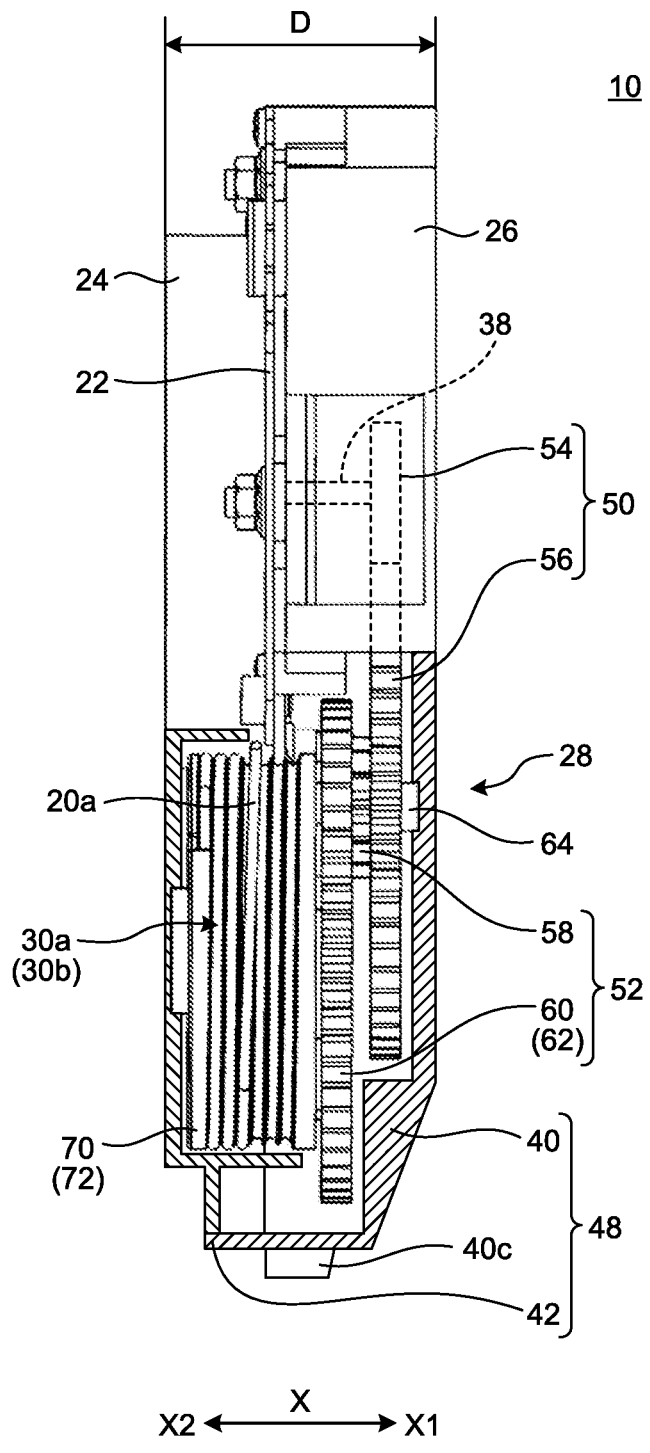
FIG. 4 is a partial cross-sectional side view of the sliding-door drive device.
Figure 8:
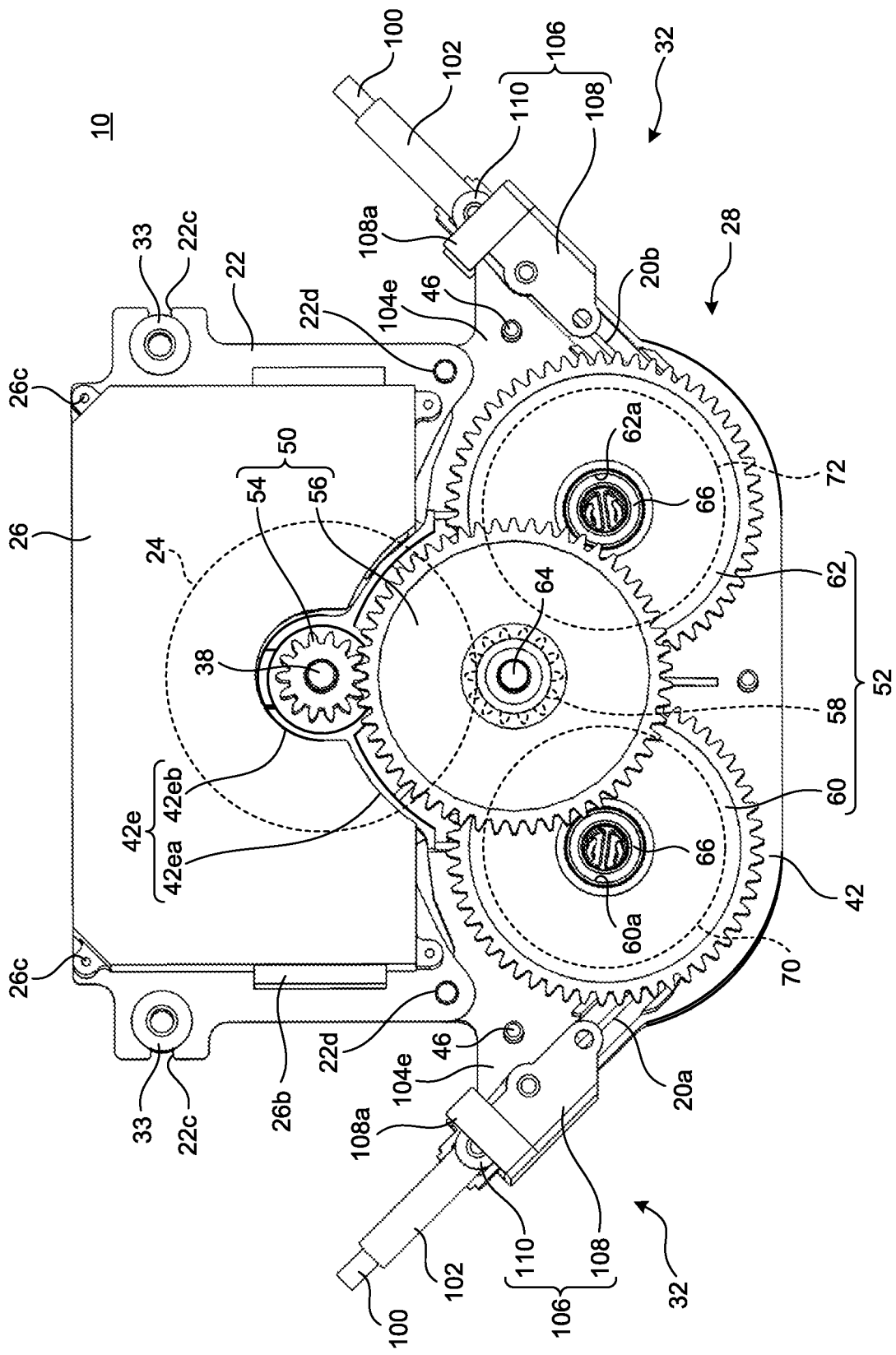
FIG. 8 is a front view of the sliding-door drive device in a state where the first housing is removed.

As illustrated in FIG. 2, FIG. 3, FIG. 4, and FIG. 5, the sliding-door drive device 10 has a front-back symmetric structure, it includes the opening cable 20a and the closing cable 20b, a base plate 22, a motor 24, an Electric Control Unit (ECU) 26, a speed reducing mechanism 28, an opening drum mechanism 30a and a closing drum mechanism 30b, and path-length adjustment mechanisms 32 in front and back as a pair, and it is formed as a single unit. In the explanation of the sliding-door drive device 10, for convenience sake, an output shaft 38 of the motor 24 is used as a reference: its axial direction is in an X direction, a direction toward the indoor side is referred to as an X1 direction (first direction), and a direction toward the outdoor side is referred to as an X2 direction (second direction). Furthermore, when the sliding-door drive device 10 is a single unit, the side illustrated in FIG. 4 is a side surface, and the side illustrated in FIG. 8 is the front side. Furthermore, the right-and-left direction based on FIG. 8 is equivalent to the front-back direction in a state of being installed in the vehicle 12.

Schematically, in the lower portion of the sliding-door drive device 10, the speed reducing mechanism 28 is arranged on the side in the X1 direction, and the opening drum mechanism 30a and the closing drum mechanism 30b are arranged on the side in the X2 direction; in the upper portion, the ECU 26 is arranged on the side of the X1 direction and the motor 24 is arranged on the side of the X2 direction with the base plate 22 interposed therebetween; and the path-length adjustment mechanisms 32 are arranged on sides of the front and back.

The base plate 22 is a metallic plate as a base of the sliding-door drive device 10, and includes: a circular arc cutout 22a into which part of the motor 24 is fitted; three motor fastened holes 22b that are provided around the circular arc cutout 22a; fixing cutouts 22c that are provided on an upper portion in the front and back; and housing fastened holes 22d that are provided on a lower portion in the front and back. Each of the two fixing cutouts 22c is provided with a bush 33 and a washer 34, and they are secured to the inner side of the quarter panel 18 with an undepicted bolt. The base plate 22 may be omitted when part of a first housing 40 or a second housing 42, described below, is shaped to perform its functionality.

The motor 24 is a 12-pole 8-phase flat and thin brushless motor that is of an inner rotor type and that uses a neodymium magnet. On the front side of the motor 24, a U-phase wire 24a, a V-phase wire 24b, and a W-phase wire 24c are arranged at intervals of 120°. The circumferential surface of the motor 24 is provided with attachment hole bases 24d that correspond to the above-described motor fastened holes 22b, and a screw 36 is fitted into the attachment hole base 24d and the motor fastened hole 22b and a nut 37 is engaged from the back side so that the motor 24 is secured to the base plate 22. The output shaft 38 protrudes from the center of the motor 24 in the X1 direction.

The characteristics of the motor 24 are further explained. The motor 24 is a brushless motor having no brushes which cause a bottleneck in service lifetime, so as to have a long service lifetime and also a high mechanical efficiency. Furthermore, as there is no brushing while an electric current is applied to the brush, there is no sound of brushing and there is little noise, and as there is no occurrence of sparks due to brushing, there is little EMC noise. Furthermore, absence of a brush allows a reduction in thickness. The motor 24 is of an inner rotor type and has a coil arranged on the outer circumference, so as to have a superior heat release performance and a low rotary inertia. It is easy to increase the number of poles of a brushless motor, and the increase in number of poles reduces cogging.

As the characteristics of the brushless motors, the motor 24 is capable of performing stopping retention control to generate a retention torque even in a stopped state. This allows the door 14 to be retained in a stopped state on an area with a certain degree of tilt, there is no need to provide a separate clutch for retention, and a reduction in size and a reduction in thickness of the sliding-door drive device 10 are possible. As the motor 24 is capable of performing a step control like a stepping motor, it is superior in control performance and rotation accuracy. Furthermore, as the motor 24 also enables sine wave drive, torque fluctuations may be reduced.

When there is a need for urgent braking during a sliding operation of the door 14, the motor 24 performs the above-described stopping retention control to apply a forced braking power so as to obtain a strong braking power. Furthermore, the motor 24 is capable of changing the magnetic force of a permanent magnet due to vector control, and maycan conduct a high-torque low-rotation drive or a low-torque high-rotation drive in accordance with the type of the door 14 or other specifications. Furthermore, due to high-voltage low-rotation control, operation of stepping motors can be obtained. During the low-voltage high-rotation control, an assist for manually opening and a closing operation is enabled in a manual opening and closing mode of the door 14.

As the motor 24 uses a brushless motor, behaviors of the door 14 are stable based on the above-described characteristics. Furthermore, because of an improvement in control performance, a low-current operation is enabled, and a reduction in a harness diameter and a fuse capacitance and a reduction in costs can be achieved. As the motor 24 is a brushless motor, the motor 24 can have a flat shape, and it is confirmed that, according to the present embodiment, the ratio of the diameter/the axial-direction thickness of 4.45 to 4.70 is achieved, and a reduction in thickness is achieved as compared with motors that are conventionally used for this use application. As the thickness of the motor 24 is reduced, it is easily integrated with the sliding-door drive device 10.

Next, the ECU 26 is a device that covers a control-circuit board with a chassis, and includes an inverter circuit that controls the motor 24. The ECU 26 is shaped like a box that is thin and slightly oblong, and includes a two-stage circular arc concave portion 26a provided in a lower portion, a connector 26b provided on a side surface, and screw holes 26c on four corners. Power and sensor signals are supplied to the connector 26b through an undepicted harness. As the connector 26b is provided on the side surface of the ECU 26, the connected harness does not protrude in the X direction. The ECU 26 is secured to the base plate 22 by inserting the screws 36 through the screw holes 26c on the four corners. The ECU 26 is connected to the U-phase wire 24a, the V-phase wire 24b, and the W-phase wire 24c so as to control the motor 24.

The speed reducing mechanism 28 reduces the rotation of the motor 24 and transmits it to the opening drum mechanism 30a and the closing drum mechanism 30b. The X1 direction, the side surface, and the lower surface of the speed reducing mechanism 28 are covered with the first housing 40, the X2 direction, the side surface, and the lower surface of the opening drum mechanism 30a and the closing drum mechanism 30b are covered with the second housing 42, and the outer peripheries of the first housing 40 and the second housing 42 are engaged with each other to house the speed reducing mechanism 28, the opening drum mechanism 30a, and the closing drum mechanism 30b (see FIG. 4). The first housing 40 and the second housing 42 are engaged through two claws 47 (see FIG. 3) on the lower surface.

The first housing 40 has a flat circular portion 40a as a base, and includes a bulging portion 40b in the X1 direction; fixing protrusion pieces 40c provided on a lower portion in the front and back; and first cable supporting pieces 40d extend obliquely upward from lateral sides in the front and back. The bulging portion 40b includes a large circular portion 40ba and a small circular arc portion 40bb that protrudes from the top thereof and that is approximately 200°. At the center of the small circular arc portion 40bb, a shaft hole 40bc is provided through which the output shaft 38 of the motor 24 is fitted and pivotally supported.

Each of the two fixing protrusion pieces 40c is provided with a circular cutout and is attached with the bush 33 and the washer 34 so that it is secured to the inner surface of the quarter panel 18 with a bolt in the same manner as the above-described fixing cutout 22c. The first cable supporting piece 40d is a component of the path-length adjustment mechanism 32.

Figure 7:
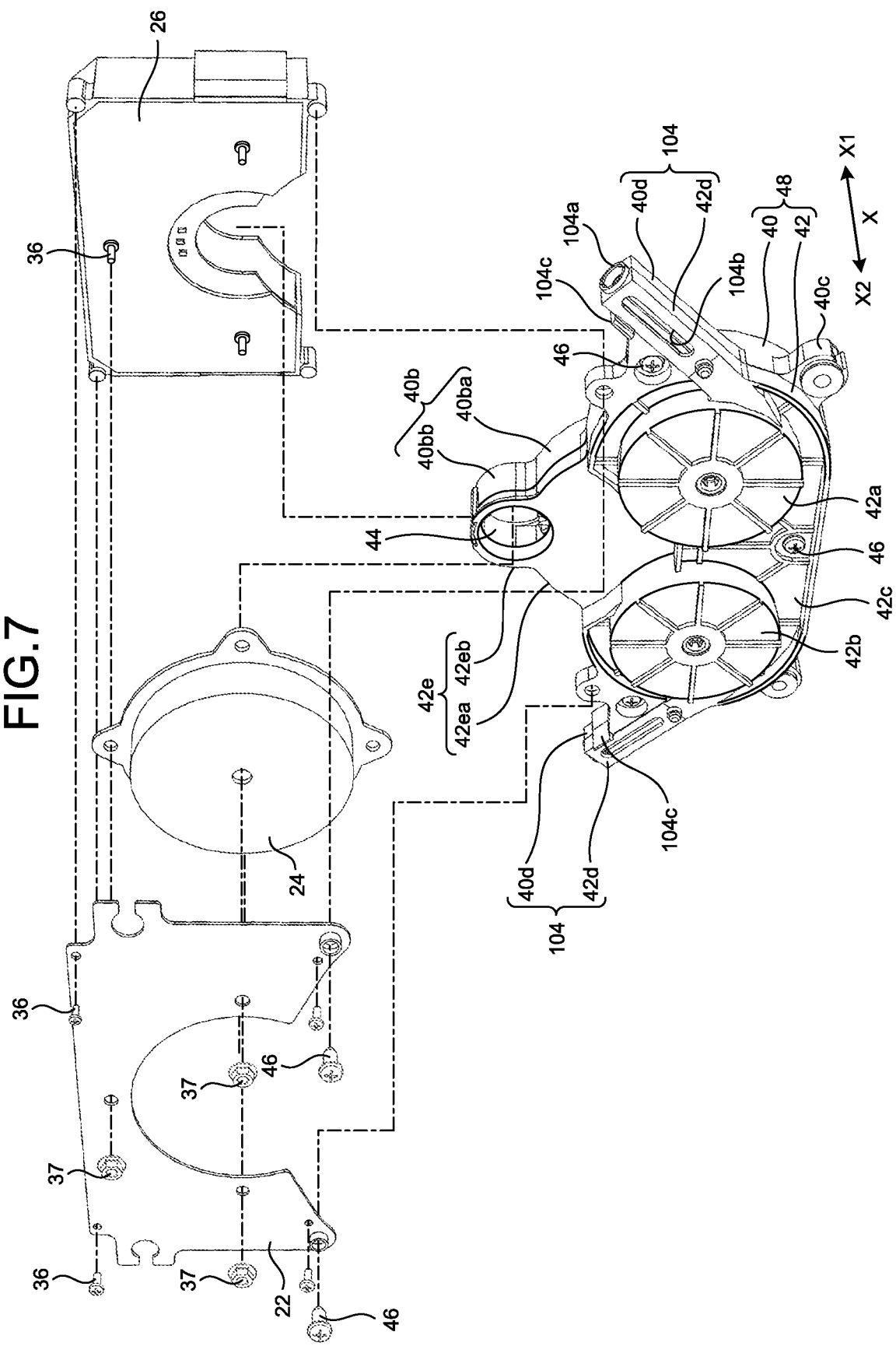
FIG. 7 is an exploded perspective view of a module combining a first housing and a second housing, a motor, a base plate, and an ECU.

The first housing 40 and the second housing 42 are fixed to each other to form a single module 48 (see FIG. 7). It be preferable that the width of the module 48 in the X direction be less than a width D from the X1-direction end surface of the ECU 26 to the X2-direction end surface of the motor 24. In this way, by setting the width of the module 48 to be less than the total width from the end surface of the ECU 26 to the end surface of the motor 24, a reduction in the thickness is achieved.

On the X1-direction end surface of the sliding-door drive device 10, the end surface of the ECU 26 and the end surface of the first housing 40 are on the identical plane, and on the X2-direction end surface, the end surface of the motor 24 and the end surface of the second housing 42 are on the identical plane. Thus, there is no unnecessary concavity and convexity on both side surfaces, and an efficient use of the spaces is achieved. Furthermore, it is confirmed that the width D of the sliding-door drive device 10 in the X direction is sufficiently reduced due to various measures taken to reduce the thickness to be 45 to 59 mm, and more reduction in thickness is achieved than sliding-door drive devices according to related-art technologies.

Figure 5:
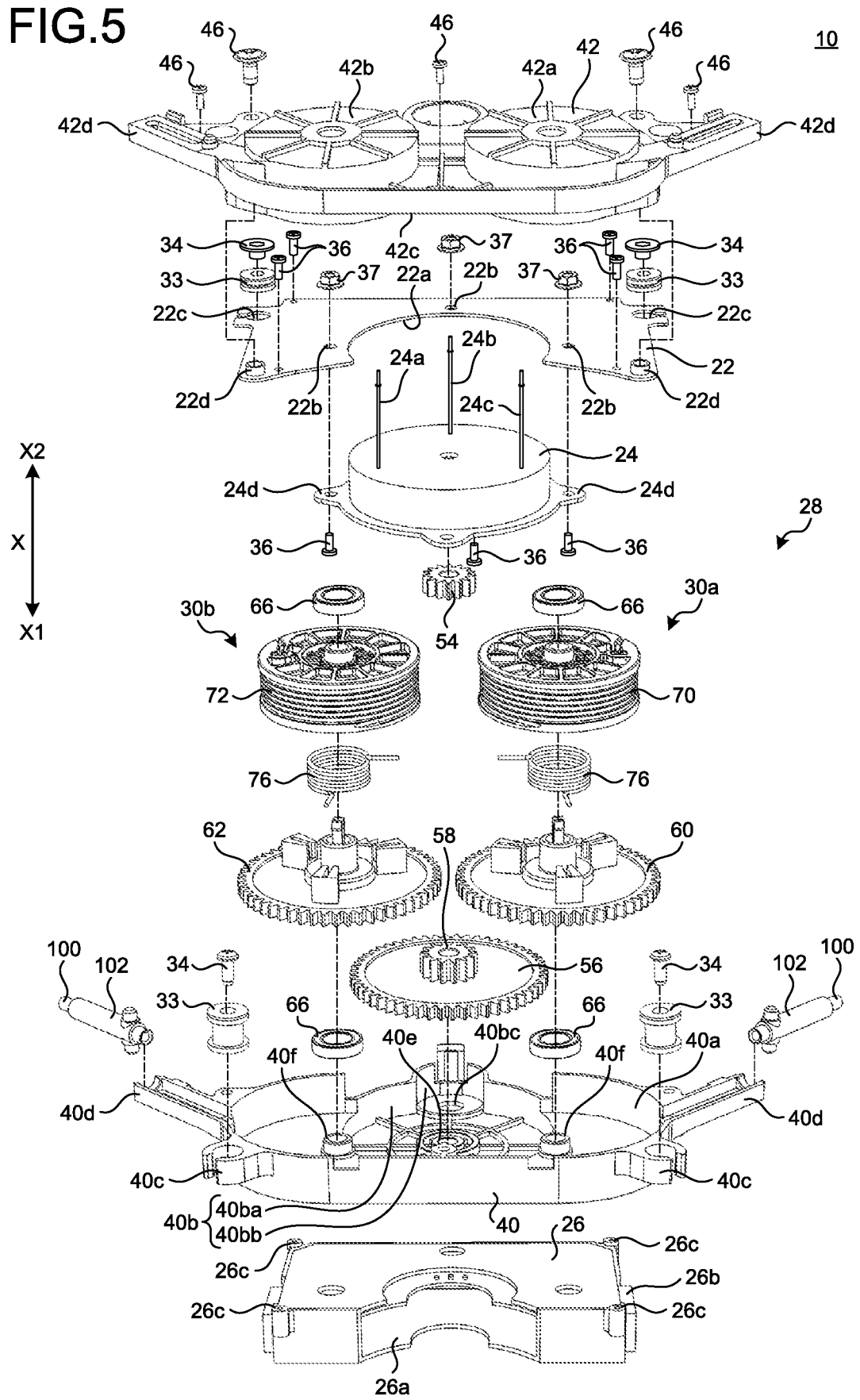
FIG. 5 is an exploded perspective view of the sliding-door drive device.
Figure 6:
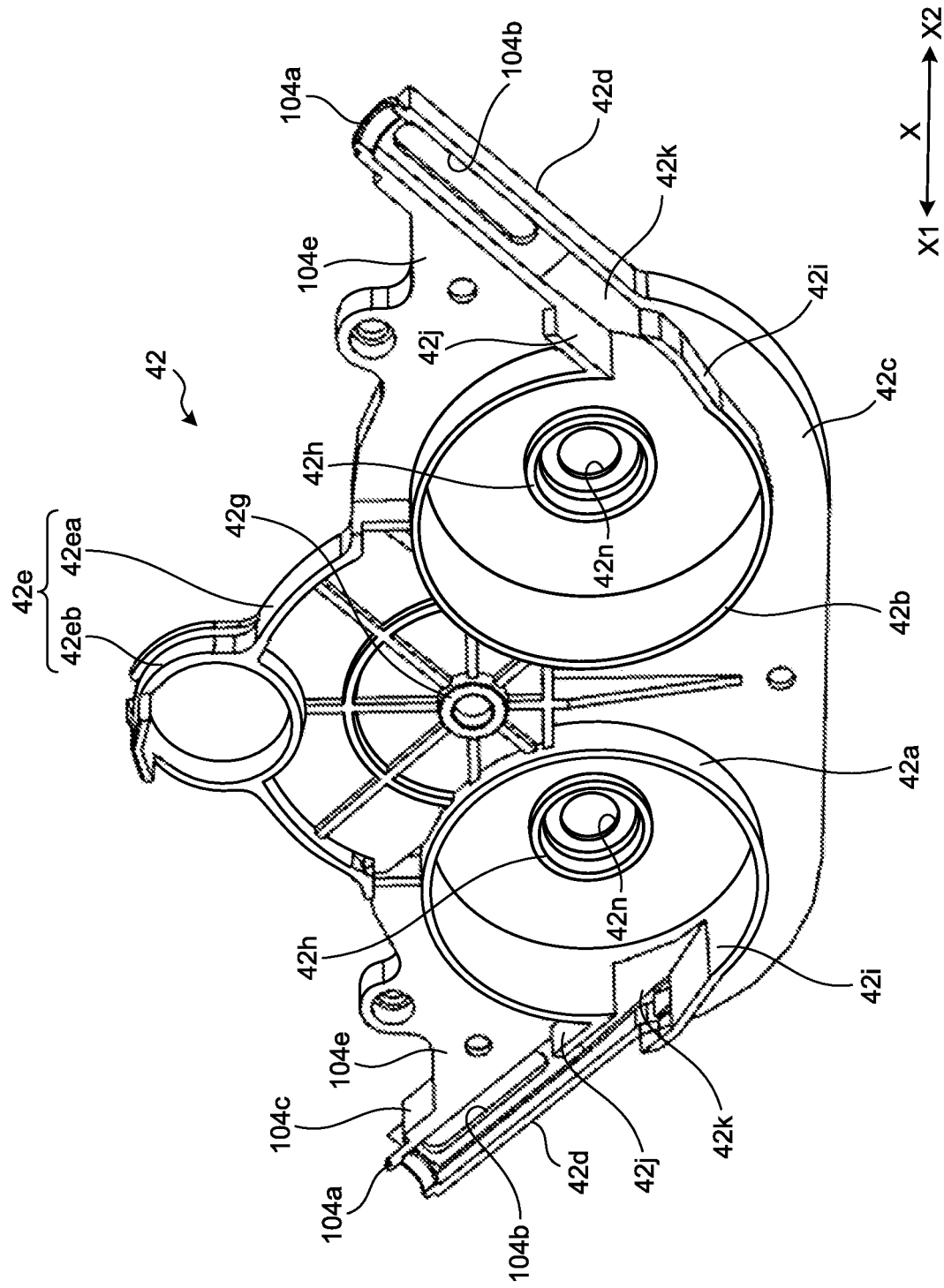
FIG. 6 is a perspective view that illustrates an inner side of a second housing.

As illustrated in FIG. 5 and FIG. 6, the second housing 42 includes a tube 42a and a tube 42b that bulges in the X2 direction and are parallel to each other; a thin chassis 42c with an opening in the X1 direction; second cable supporting pieces 42d that extend obliquely upward from lateral sides in the front and back; and a protruding portion 42e in an upper section. The protruding portion 42e includes a large circular arc portion 42ea and a small circular arc portion 42eb. The tube 42a and the tube 42b protrude in the X1 direction and the X2 direction, and they are formed like a tube with a bottom where it has an opening in the X1 direction and it is substantially closed in the X2 direction.

As illustrated in FIG. 6, the second housing 42 further includes: a circular projection 42g that is formed at the center of the circular arc portion 42ea and that is low with a small diameter; circular projections 42h that are formed on the bottom of the tube 42a and the tube 42b and that are slightly wide and low; outer walls 42i that extend in line of tangency smoothly from lower portions of the tube 42a and the tube 42b toward the second cable supporting pieces 42d; and short inner walls 42j that are opposed to the outer walls 42i. The outer walls 42i and the inner walls 42j form cable introducing openings 42k for guiding the opening cable 20a and the closing cable 20b to the tube 42a and the tube 42b. A hole 42n is provided at the center of the circular projection 42h.

As illustrated in FIG. 7, the circular arc portion 42eb is engaged with the circular arc portion 40bb to form a circular hole 44 that has an opening in the X2 direction and on the lower surface and that is closed in the X1 direction. The first housing 40 and the second housing 42 are fastened with five screws 46 to form the above-described single module 48. The module 48 houses the speed reducing mechanism 28, the opening drum mechanism 30a, and the closing drum mechanism 30b. The base plate 22 is integrally fixed to the module 48 with the two screws 46. The ECU 26 is arranged to cover the top surface of the module 48, and is secured to the base plate 22 with the screw 36 and the nut 37.

Figure 9:
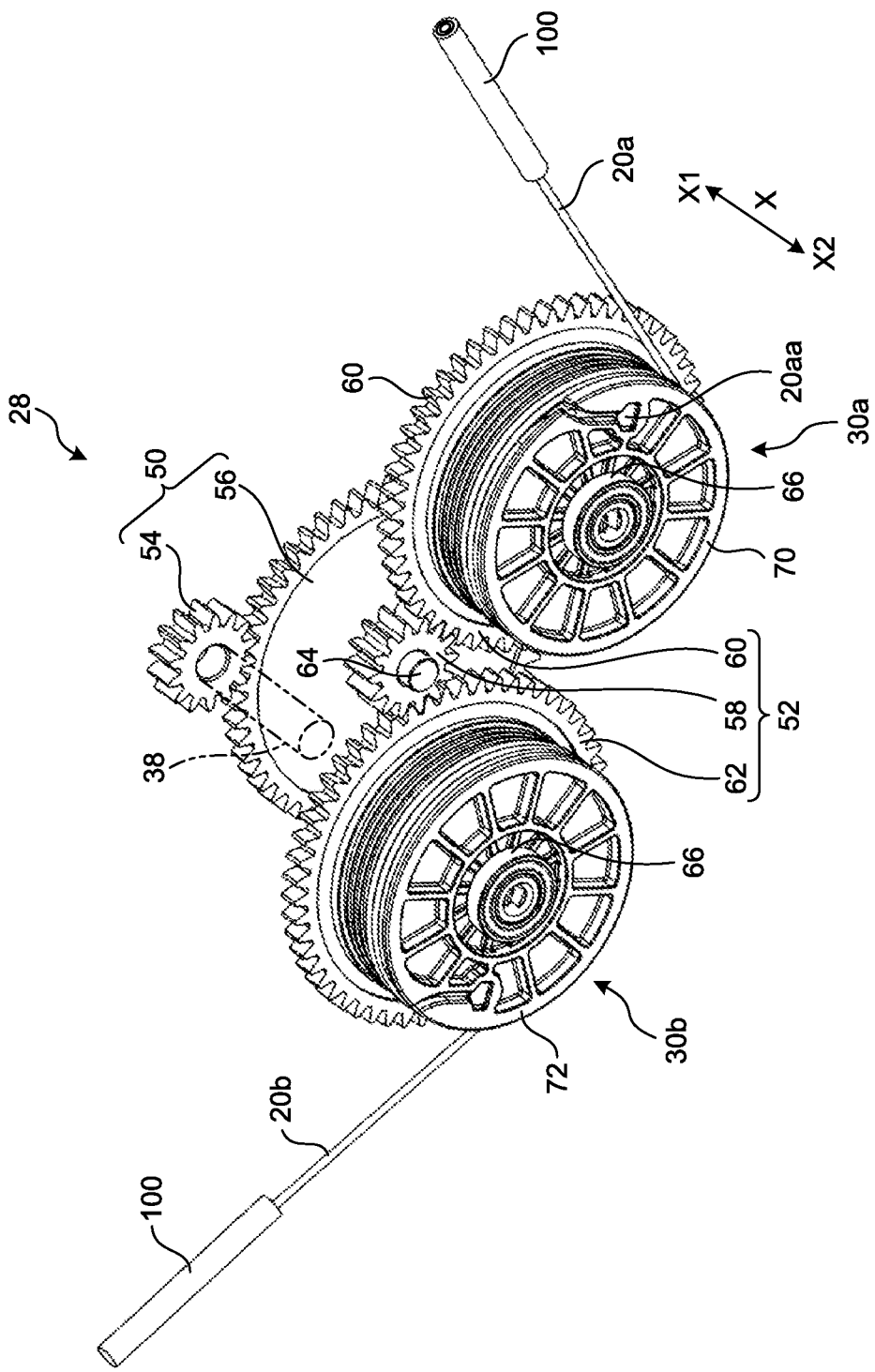
FIG. 9 is a perspective view illustrating a speed reducing mechanism.

As illustrated in FIG. 8 and FIG. 9, the speed reducing mechanism 28 includes a first-stage speed reducing unit 50 and a second-stage speed reducing unit 52. The first-stage speed reducing unit 50 includes: a first input-side gear 54 provided on the output shaft 38 of the motor 24; and a first output-side gear 56 that engages with the first input-side gear 54.

The second-stage speed reducing unit 52 includes: a second input-side gear 58 that is integrally and coaxially provided on the X2-direction surface of the first output-side gear 56; and an opening second output-side gear 60 and a closing second output-side gear 62 that each engage with the second input-side gear 58. The opening second output-side gear 60 and the closing second output-side gear 62 are rotated in the same direction. The first output-side gear 56 and the second input-side gear 58 are secured to an intermediate shaft 64.

The output shaft 38 and the first input-side gear 54 protrude from the motor 24 in the X1 direction, and the second input-side gear 58 is provided in the X2 direction with respect to the first output-side gear 56. The first output-side gear 56 is located under the first input-side gear 54. The opening second output-side gear 60 and the closing second output-side gear 62 are located obliquely downward of the second input-side gear 58 in the front and back.

A shallow and slightly wide circular hole 60a is provided at the center of the opening second output-side gear 60 on the side in the X1 direction, and similarly a shallow and slightly wide circular hole 62a is provided at the center of the closing second output-side gear 62 on the side in the X1 direction. A ball bearing 66 is inserted into each of the circular hole 60a and the circular hole 62a.

The output shaft 38 is pivotally supported in the shaft hole 40bc as described above, the first input-side gear 54 provided on the output shaft 38 is located in the circular hole 44, and the first output-side gear 56 is located in the large circular portion 40ba. The X1-direction side of the intermediate shaft 64 is pivotally supported by a low circular projection 40e of the circular portion 40ba, and the X2-direction side thereof is pivotally supported by the circular projection 42g. The opening second output-side gear 60 and the closing second output-side gear 62 are pivotally supported on the X1-direction side as the ball bearings 66 inserted into the circular hole 60a and the circular hole 62a are fitted into circular projections 40f (see FIG. 5).

The first input-side gear 54 and the second input-side gear 58 are gears that have the same shape and the same number of teeth. The first output-side gear 56, the opening second output-side gear 60, and the closing second output-side gear 62 have the same shape and the same number of teeth, and the diameter and the number of teeth thereof are approximately three times as many as those of the first input-side gear 54 and the second input-side gear 58.

When viewed in the X direction (see FIG. 8), the triangle formed by three points with the shaft center of the output shaft 38 and the first input-side gear 54, the shaft center of the opening second output-side gear 60, and the shaft center of the closing second output-side gear 62 is a equilateral triangle. The shaft center of the first output-side gear 56 and the shaft center of the second input-side gear 58, i.e., the position of the intermediate shaft 64, is a position with an equal distance to each vertex of the equilateral triangle, i.e., the circumcenter. With this arrangement, the speed reducing mechanism 28 can have a balanced and compact structure.

The first input-side gear 54 is a copper-iron based sintered material, and the first output-side gear 56 and the second input-side gear 58 are a resin material. As the first input-side gear 54 is made of a copper-iron based sintered material, delivery of output of the motor 24 without fail and a longer service lifetime can be achieved. Furthermore, as the first output-side gear 56 and the second input-side gear 58 are made of a resin material, a reduction in weight and costs can be achieved.

As illustrated in FIG. 9, the opening drum mechanism 30a is coaxially provided on the X2-direction side of the opening second output-side gear 60, and the closing drum mechanism 30b is coaxially provided on the X2-direction side of the closing second output-side gear 62. An opening drum 70 of the opening drum mechanism 30a has the opening cable 20a wound around and rotates by the opening second output-side gear 60. A closing drum 72 of the closing drum mechanism 30b has the closing cable 20b wound around and it is rotated by the closing second output-side gear 62. The rotation axis of each gear of the motor 24, the opening drum 70, the closing drum 72, and the speed reducing mechanism 28 is oriented in the X direction, and they are parallel. The opening drum 70 and the closing drum 72 are arranged in parallel in radial directions. Here, the parallel arrangement in a radial direction means that the circumferential surfaces of the opening drum 70 and the closing drum 72 are overlapped with each other when viewed from the side surface in FIG. 4.

Figure 17:
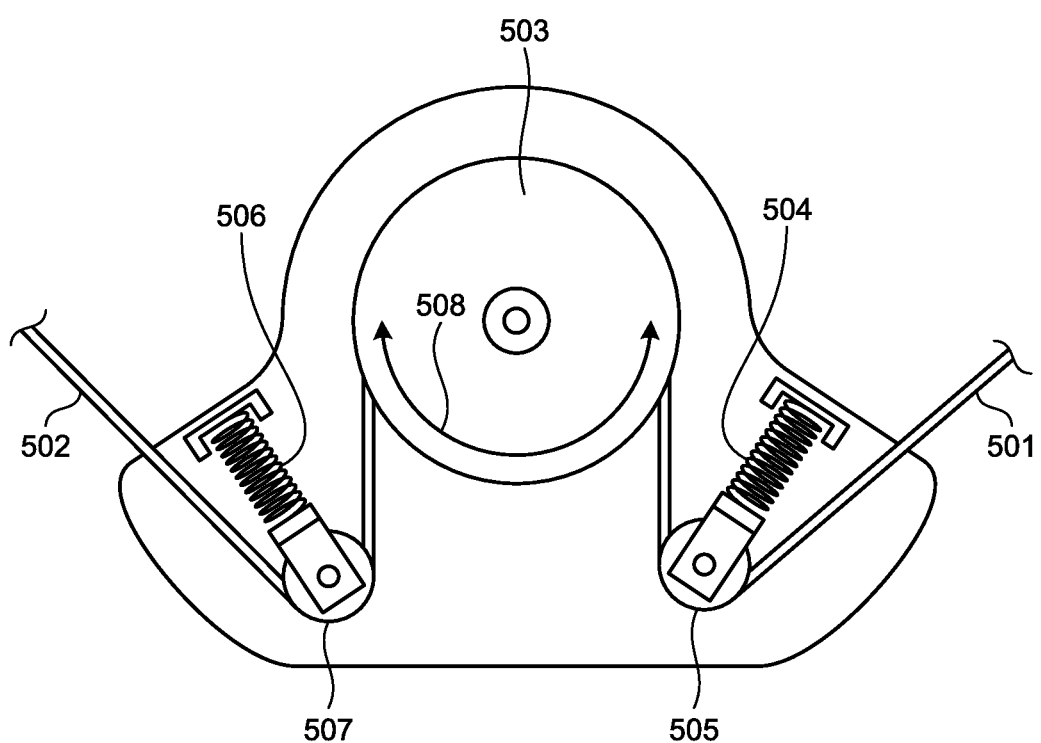
FIG. 17 is a schematic perspective view of a motor unit according to a related-art technology.

In this way, only the opening cable 20a is wound around the opening drum 70, only the closing cable 20b is wound around the closing drum 72, the opening cable 20a and the closing cable 20b are not overlapped in an axial direction, and there are no pulleys to changing and guide the extending direction, whereby there is no waste of space for winding each cable and the X-direction widths of the opening drum 70 and the closing drum 72 can be accordingly reduced. It is understood that, as compared with the motor unit according to the related-art technology illustrated in FIG. 17, windings of the opening cable 501 and the closing cable 502 by 180° are efficiently used in the present application and the X-direction width is accordingly reduced. Furthermore, as the opening drum 70 and the closing drum 72 are arranged parallel in radial directions, the X-direction width can further be reduced.

Furthermore, in the speed reducing mechanism 28, the rotation of the output shaft 38 is transmitted to the first input-side gear 54 in the X1 direction and, after passing to the first output-side gear 56, is conversely transmitted to the second input-side gear 58 in the X2 direction. Furthermore, the rotation of the output shaft 38 is delivered in the X2 direction through the opening second output-side gear 60 and the closing second output-side gear 62 and is transmitted to the opening drum mechanism 30a and the closing drum mechanism 30b.

Next, the opening drum mechanism 30a is explained. As the opening drum mechanism 30a and the closing drum mechanism 30b have a symmetric structure in the front and back and have the same function effect, the corresponding components are attached with the same reference numeral below, and detailed explanations thereof are omitted.

Figure 10:
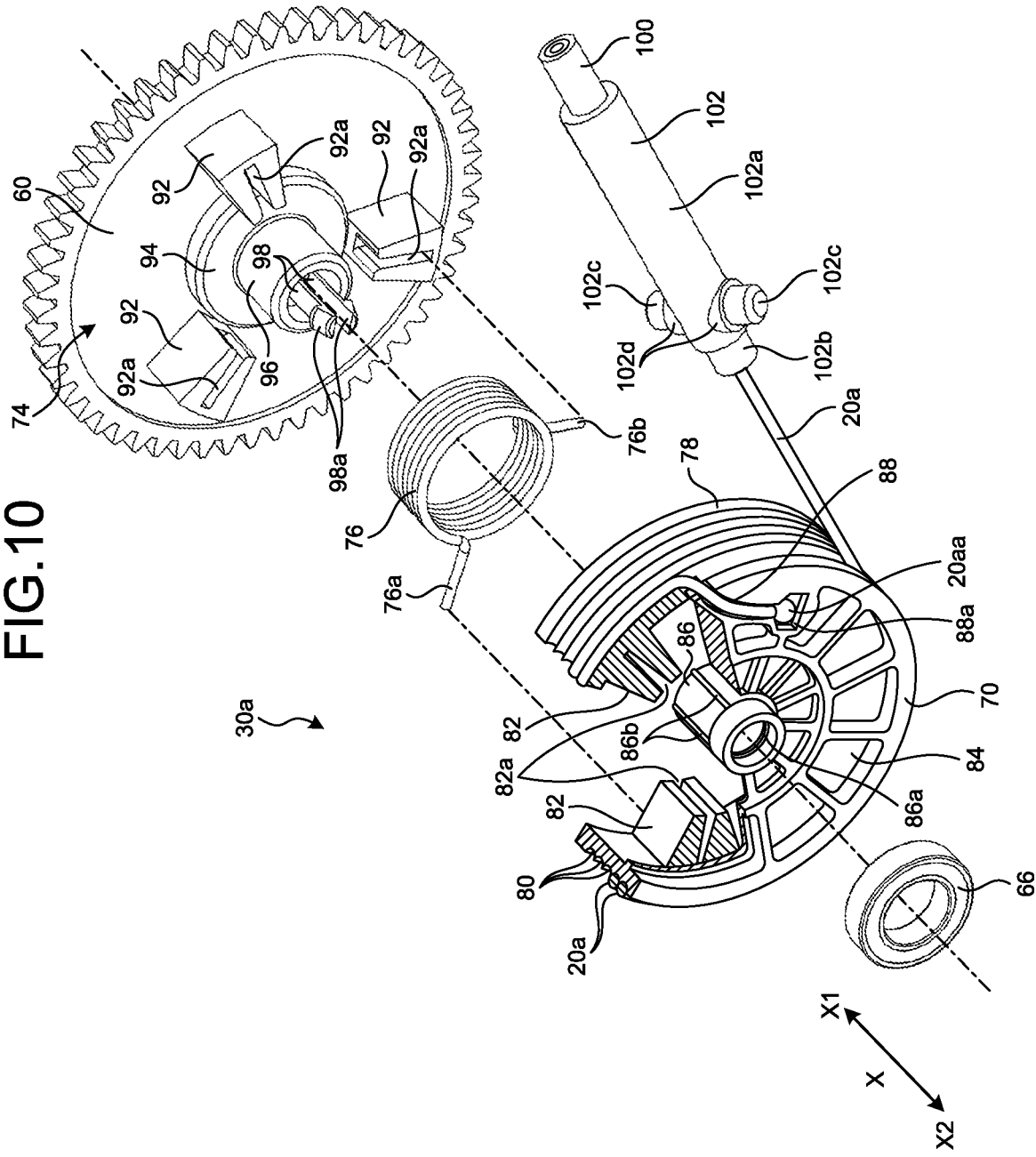
FIG. 10 is a partially cross-sectional exploded perspective view of an opening drum mechanism.

As illustrated in FIG. 10, the opening drum mechanism 30a includes the opening drum 70, a gear integral unit 74, and a torsion spring (elastic winding unit) 76. The torsion spring 76 pulls the opening cable 20a in a direction in which the opening cable 20a is wound around the opening drum 70, and principally a looseness of the opening cable 20a can be eliminated when the sliding-door drive device 10 is assembled.

The opening drum 70 is made of resin, and includes: a drum 78 that has an opening in the X1 direction; a helical groove 80 provided on the outer circumference of the drum 78; three rotation stoppers 82 provided on the inner circumference of the drum 78; an end plate 84 that covers the side of the drum 78 in the X2-direction; a cylindrical portion 86 provided at the center of the end plate 84; and a cable groove 88 that connects from the side surface of the end plate 84 to the helical groove 80. The helical groove 80 has a U-shaped cross-sectional surface that is suitable for winding the opening cable 20a and holding the opening cable 20a.

The drum 78 is a base part of the opening drum 70, and has a slightly smaller diameter than the part of the opening second output-side gear 60 excluding its outer periphery teeth. The helical groove 80 has a helix formed on the outer circumference of the drum 78, and the groove has a length necessary to wind the opening cable 20a.

When the door 14 is fully open, the opening cable 20a is wound around substantially the entire length of the helical groove 80 of the opening drum 70, and substantially the entire closing cable 20b is unwound from the helical groove 80 of the closing drum 72. Conversely, when the door 14 is fully closed, the closing cable 20b is wound around substantially the entire length of the helical groove 80 of the closing drum 72, and substantially the entire opening cable 20a is unwound from the helical groove 80 of the opening drum 70. In this way, the circumferential surfaces of the opening drum 70 and the closing drum 72 are used as the helical groove 80 without any waste, and the X-direction width thereof is accordingly reduced.

The three rotation stoppers 82 are provided at intervals of 120° such that they protrude from the inner circumferential wall of the drum 78 toward the center. However, in FIG. 10, one of the rotation stoppers 82 is concealed by the end plate 84. The rotation stopper 82 is formed into substantially a trapezoidal shape, when viewed in the X direction, where the center side is narrower in a circumferential direction with the drum 78 as a reference and the outer side is wider in a circumferential direction. The X2-direction side of the rotation stopper 82 connects to the end plate 84 so that a sufficient intensity is obtained. A slit 82a is provided at the center of the rotation stopper 82 in a circumferential direction. With the drum 78 as a reference, the slit 82a has an opening on the center side and in the X1 direction, and is deeper in a radial direction and is narrower in a circumferential direction.

The cylindrical portion 86 is provided at the center of the end plate 84, protrudes to have substantially the same length as the drum 78 in the X1 direction, and protrudes to be slightly longer than the drum 78 in the X2 direction. On the outer circumference of the cylindrical portion 86, a plurality of projections 86b is provided to reduce friction with the inner circumference of the torsion spring 76. The projections 86b extend in the shape of a thin rod in the X direction, and they are arranged at an equal angle on the outer circumference of the cylindrical portion 86. The ball bearing 66 is fitted around the part of the cylindrical portion 86 protruding from the end plate 84 in the X2 direction.

The cable groove 88 communicates from the groove end portion of the helical groove 80 to the side surface of the end plate 84, and a slightly wide fastener housing portion 88a is provided in the end portion. The cable groove 88 communicates with the helical groove 80 such that an area close to the fastener housing portion 88a has a low angle with respect to a circumferential direction with the drum 78 as a reference and is steeper as located closer to the outer circumference. A fastener 20a a is fixed at the end portion of the opening cable 20a, and the fastener 20a a is fitted into the fastener housing portion 88a to retain the opening cable 20a. The opening cable 20a is guided from the fastener housing portion 88a to the helical groove 80 through the cable groove 88, and it is wound around in a helical fashion with substantially no spaces.

The gear integral unit 74 is part of the opening drum mechanism 30a, and is formed on the X2-direction side surface of the opening second output-side gear 60 due to casting, and all the components thereof protrude in the X2 direction. The gear integral unit 74 includes: three rotation stoppers 92 that are provided at intervals of 120°; a low circular base 94 that is provided at the center of the opening second output-side gear 60; and a cylindrical portion 96 and a pair of two rods 98 further protruding from the circular base 94.

The rotation stopper 92 has substantially the same shape as that of the above-described rotation stopper 82, and is formed into substantially a trapezoidal shape where the center side is narrower in a circumferential direction and the outer side is wider in a circumferential direction with the drum 78 as a reference when viewed in the axial direction. A slit 92a is provided at the center of the rotation stopper 92 in a circumferential direction. With the drum 78 as a reference, the slit 92a has an opening on the center side and in the X2 direction, becomes deeper in an outward direction, and becomes narrower in a circumferential direction. The three rotation stoppers 92 have a dimension so as to be fitted into the inner circumference of the drum 78 with a slight space. The outer diameter of the cylindrical portion 96 has a dimension to engage with the inner circumference of the cylindrical portion 86. The rods 98 in pair are provided on the inner side of the cylindrical portion 96 so as to face each other, protrude from the circular base 94, and protrude to be longer than the cylindrical portion 96, and each of them includes a projection 98a at its distal end. In the torsion spring 76, an end portion 76a in the X2 direction and an end portion 76b in the X1 direction are bent outwardly.

The opening drum mechanism 30a is assembled as described below. First, the torsion spring 76 is fitted around the cylindrical portion 86 such that the end portion 76a enters the slit 82a of any of the rotation stoppers 82. Then, the cylindrical portion 96 engages with the cylindrical portion 86 such that the end portion 76b enters the slit 92a of any of the rotation stoppers 92. The rotation stopper 82 and the rotation stopper 92 are assembled without any interference. After sufficient engagement, each of the rods 98 in pair enters the back of the cylindrical portion 86, and each of the projections 98a in the distal end is engaged with a circular projection 86a so as to be retained. The ball bearing 66 is fitted around the X2-direction end portion of the cylindrical portion 86, and after the fastener 20a a is further fitted into the fastener housing portion 88a, the opening cable 20a is wound around the cable groove 88 and the helical groove 80.

The cylindrical portion 86 is engaged with the circular projection 42h of the second housing 42 (see FIG. 6) through the ball bearing 66, and part of the cylindrical portion 86 is inserted into the hole 42n (see FIG. 3) to be pivotally supported. Thus, the X2-direction sides of the opening second output-side gear 60, the closing second output-side gear 62, the opening drum mechanism 30a, and the closing drum mechanism 30b are pivotally supported. The outer circumference of the opening drum 70 is covered with the tube 42a of the second housing 42.

Furthermore, the opening drum 70 is pivotally supported to be rotatable with respect to the opening second output-side gear 60 within an operating angular range that is appropriately limited by the rotation stoppers 82 and the rotation stoppers 92, and due to the rotary elastic action of the torsion spring 76, a tensional force can be applied to the opening cable 20a within the operating angular range. Thus, the opening cable 20a can be wound and unwound within an appropriate range when the opening cable 20a is wired to the door 14.

Next, the path-length adjustment mechanism 32 is explained. For example, the part that corresponds to the opening cable 20a, included in the path-length adjustment mechanism 32 in the front and back, i.e., the right side part in FIG. 3, is explained; the part that corresponds to the closing cable 20b, i.e., the left side part in FIG. 3, has the same function effect as they have a symmetric structure in the front and back.

The path-length adjustment mechanism 32 includes: an outer casing 100 (see FIG. 10) into which the opening cable 20a is inserted; a cable guide 102 (see FIG. 10) provided at the end of the outer casing 100; a guide unit 104 (see FIG. 12) that movably supports the cable guide 102; and a link 106 (see FIG. 13, FIG. 16) that moves the end portion of the cable guide 102 and the outer casing 100. The path-length adjustment mechanism 32 adjusts the path length of the opening cable 20a that is wired from the opening drum 70 to the door 14, and moves the end portion of the outer casing 100 at the side close to the opening drum 70 in an extending direction of the opening cable 20a to adjust the path length of the opening cable 20a. Components of the path-length adjustment mechanism 32 are sequentially explained.

Figure 11:
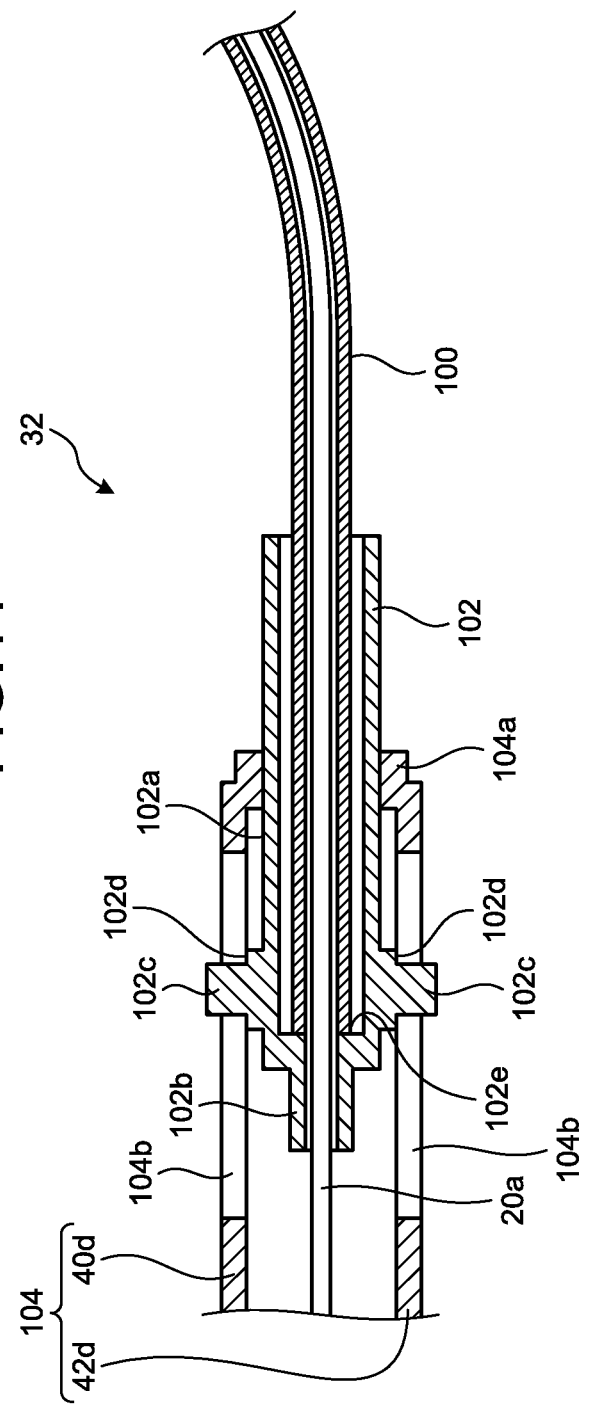
FIG. 11 is a cross-sectional view of a guide unit, a cable guide, an outer casing, and an opening cable.

As illustrated in FIG. 10 and FIG. 11, the outer casing 100 is shaped like an elongated tube with a high strength and flexibility, and has the opening cable 20a inserted through the smoothly formed inner surface with substantially no space. The outer casing 100 is a general-purpose product that is also called an outer cable or an outer tube and that is used for typical vehicles and bicycles. The outer casing 100 guides the opening cable 20a from the sliding-door drive device 10 to the door 14 without being rubbed with other parts of the vehicle 12.

The cable guide 102 is shaped like a thin and appropriately long tube, and is made of a metal or the like. The cable guide 102 includes: a long main sleeve 102a; a short sub sleeve 102b that coaxially protrudes from one end of the main sleeve 102a; and short circular projections 102c that protrude in the front and back in the neighborhood of one end of the main sleeve 102a. Each of the circular projections 102c in the front and back protrudes from a low circular base 102d. The outer diameter and the inner diameter of the sub sleeve 102b are slightly smaller than the outer diameter and the inner diameter of the main sleeve 102a, and an inner-diameter step portion 102e is formed near one end of the main sleeve 102a. The inner diameter of the main sleeve 102a is a slightly larger than that of the outer casing 100 with the inner-diameter step portion 102e as a border, and the inner diameter of the sub sleeve 102b is a smaller than that of the outer casing 100 and is a slightly larger than that of the opening cable 20a. The opening cable 20a is inserted by being penetrated through the cable guide 102. The outer casing 100 is inserted into the main sleeve 102a, and its end abuts the inner-diameter step portion 102e in a stable manner. The cable guide 102 and the outer casing 100 can be loosely fixed.

Figure 12:
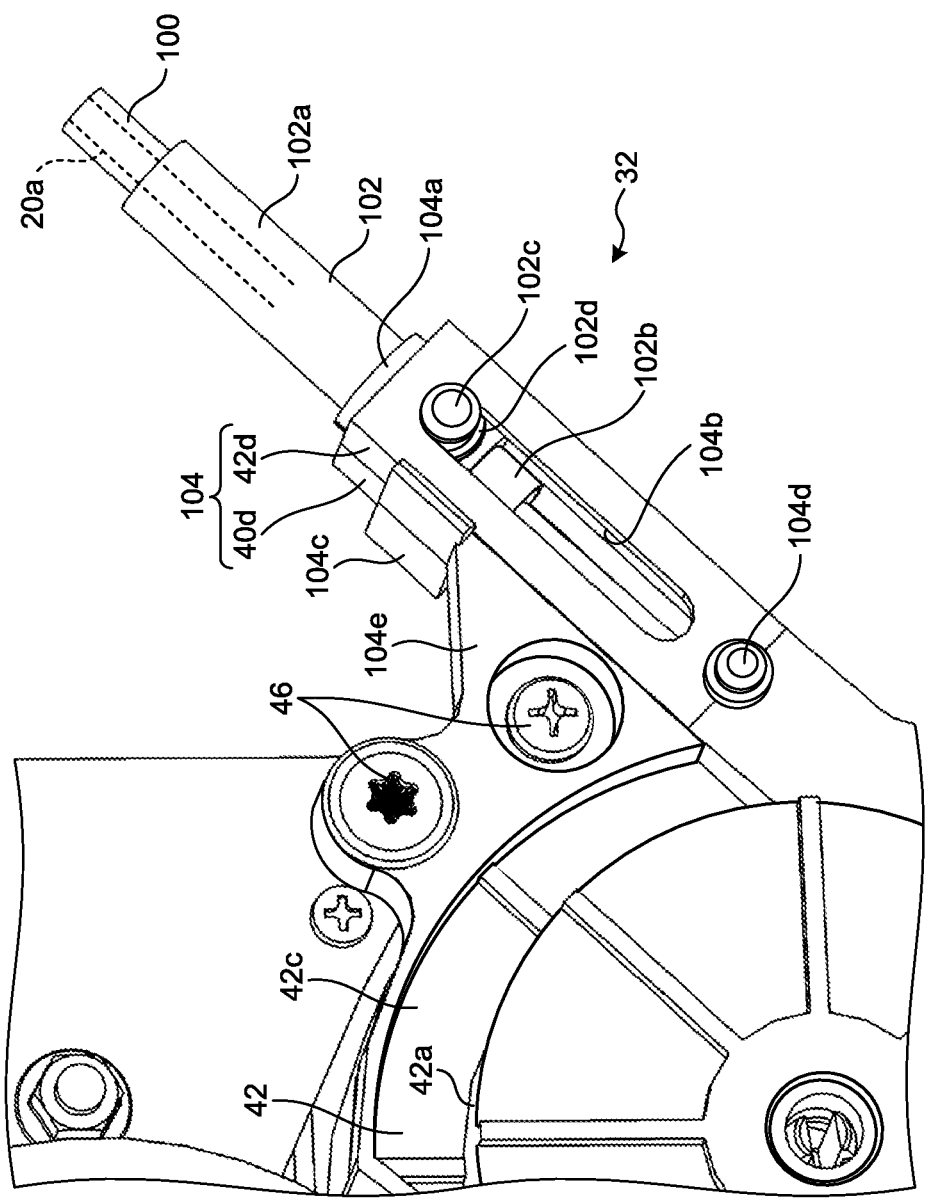
FIG. 12 is a perspective view of a path-length adjustment mechanism in a state where a link is removed.

As illustrated in FIG. 11 and FIG. 12, the guide unit 104 is formed by combining the first cable supporting piece 40d and the second cable supporting piece 42d that have a symmetrical form. The guide unit 104 is shaped like a square tube that is square in cross-section and is oriented obliquely upward, and includes: a short ring 104a provided on an end; an elongated opening 104b provided on both side surfaces; an engagement piece (an engaged unit, a path-length fixing unit) 104c provided on the upper surface near the end; and circular projections 104d provided at base parts on both side surfaces. The ring 104a and the engagement piece 104c are formed by combining the first cable supporting piece 40d and the second cable supporting piece 42d. The second cable supporting piece 42d is reinforced with a triangular plate 104e as being connected to the chassis 42c of the second housing 42. The guide unit 104 keeps an integral form as the triangular plate 104e of the first cable supporting piece 40d and part of the second cable supporting piece 42d are fastened with the screw 46.

The inner circumference of the ring 104a slidably holds the outer circumference of the main sleeve 102a in the end of the guide unit 104. The circular projection 102c is engaged with each of the elongated openings 104b on both sides. The width of the elongated opening 104b is substantially the same as the diameter of the circular projection 102c, and the circular projection 102c is slidably supported. The circular projection 102c slightly protrudes from the side surface of the guide unit 104. The engagement piece 104c is shaped like a thin plate, the ends thereof in the front and back slightly protrude from the side surfaces of the square tube of the guide unit 104, and the protruding portions form a slope surface that becomes wider outwardly.

Such the guide unit 104 allows the outer casing 100 and the cable guide 102 to be movably engaged, and can keep an appropriate direction to wind and unwind the opening cable 20a before and after the path length is changed.

Figure 13:
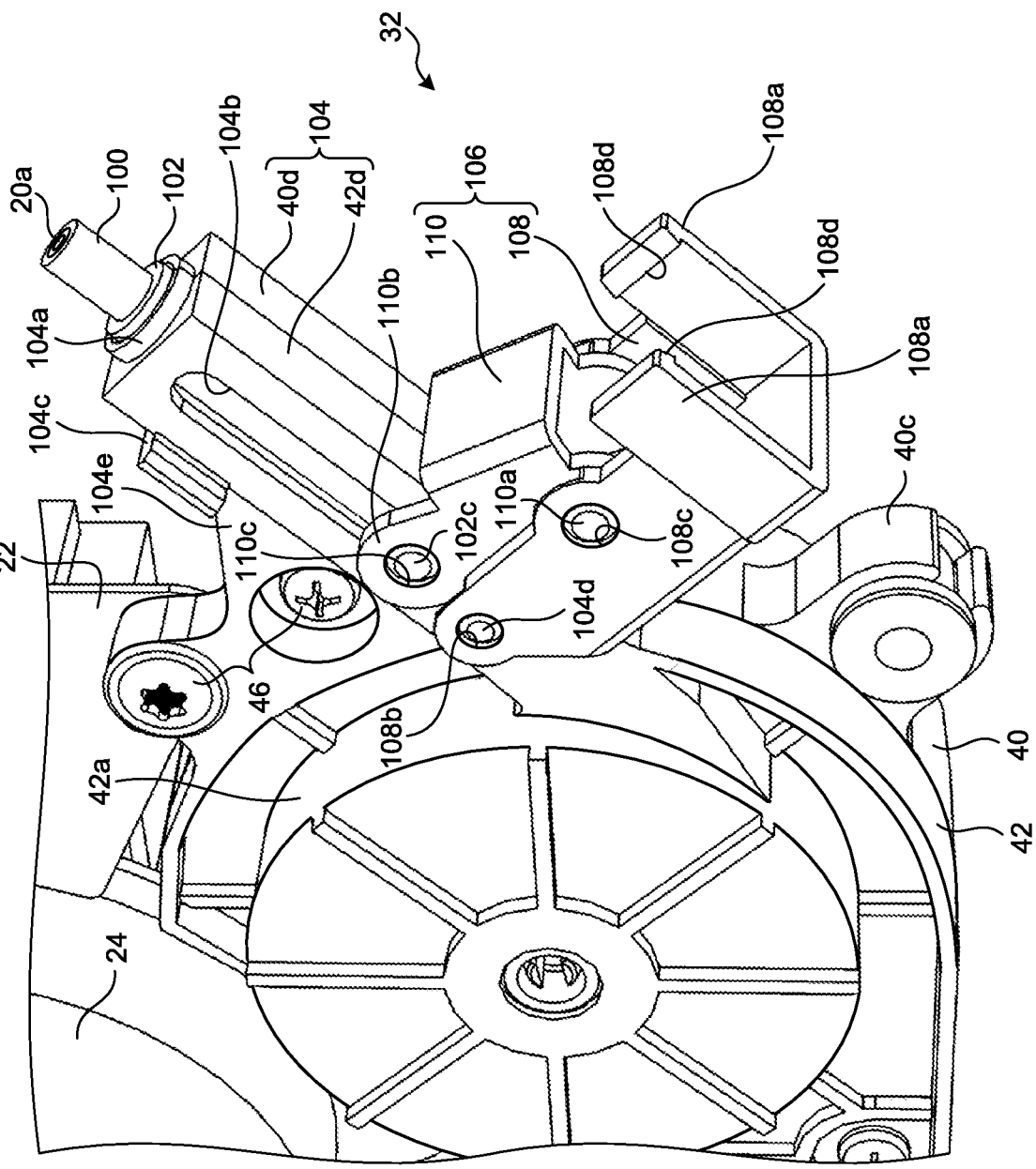
FIG. 13 is a perspective view of the path-length adjustment mechanism before a cable path length is adjusted.

As illustrated in FIG. 13, the link 106 includes a first link 108 and a second link 110 that are made of resin. The first link 108 is shaped to be rectangular in cross-section with an opening on one side, and includes: engaging projections 108a that protrude toward the opening from both sides on one end; pivot holes 108b that are formed on both sides in the vicinity of the other end to engage with the circular projections 104d; and pivot holes 108c that are formed on both sides in a middle part. The first link 108 is rotatable around the pivot hole 108b. The distal end of the engaging projection 108a is provided with a claw (an engaging unit, a path-length fixing unit) 108d that slightly protrude inwardly. The claw 108d is provided with a slope surface that has a narrow width in a protruding direction of the engaging projection 108a. The space between the two opposing engaging projections 108a is substantially equal to the front-to-back width of the engagement piece 104c, and the space between the end portions of the two opposing claws 108d is slightly smaller than the front-to-back width of the engagement piece 104c.

The second link 110 is shaped to be rectangular in cross-section with an opening on one side, and its outside width is substantially equal to the inside width of the first link 108 so as to be fitted into the inside of the first link 108. The second link 110 includes: circular projections 110a that are formed on both outer sides at one end to engage with the pivot holes 108c; a pair of protruding pieces 110b that protrude at the other end to sandwich the guide unit 104; and pivot holes 110c that are formed on the two protruding pieces 110b to engage with the circular projections 102c. The first link 108 is elastically deformable to a certain degree, and both end portions where the pivot holes 108b are provided are pushed out once so that the circular projections 104d can be inserted into the pivot holes 108b. The second link 110 is also elastically deformable to a certain degree so that the pair of protruding pieces 110b is pushed out once to insert the circular projections 102c into the pivot holes 110c and the opposite side is pushed in once to insert the circular projections 110a into the pivot holes 108c.

The above-described link 106 forms a link mechanism that have joint axes at three points, the circular projections 102c engaged with the pivot holes 110c, the circular projections 104d engaged with the pivot holes 108b, and the circular projections 110a engaged with the pivot holes 108c. The distance between the circular projection 104d and the circular projection 110a and the distance between the circular projection 110a and the circular projection 102c are fixed, and the distance between the circular projection 104d and the circular projection 102c is variable. As the circular projection 104d is fixed to the second housing 42, the circular projection 102c moves along the elongated opening 104b. When the circular projection 102c moves, the outer casing 100 and the cable guide 102 are also guided and moved in an extending direction of the guide unit 104.

Furthermore, in the path-length adjustment mechanism 32, the link 106 is a part that performs a function to adjust the path length of the opening cable 20a by moving the end portion of the outer casing 100 in an extending direction of the opening cable 20a. The engagement piece 104c and the claw 108d function as the path-length fixing unit that fixes the end portion of the outer casing 100 at an appropriate position due to engagement between them. The path-length fixing unit can fix the position of the end portion of the outer casing 100 in at least one point within the adjustable range of the path length by the path-length adjustment mechanism 32 under a design condition. With the engagement piece 104c and the claw 108d as the path-length fixing unit, the path length is automatically fixed after the path length is adjusted, whereby simple one-touch operation is possible.

Figure 14:
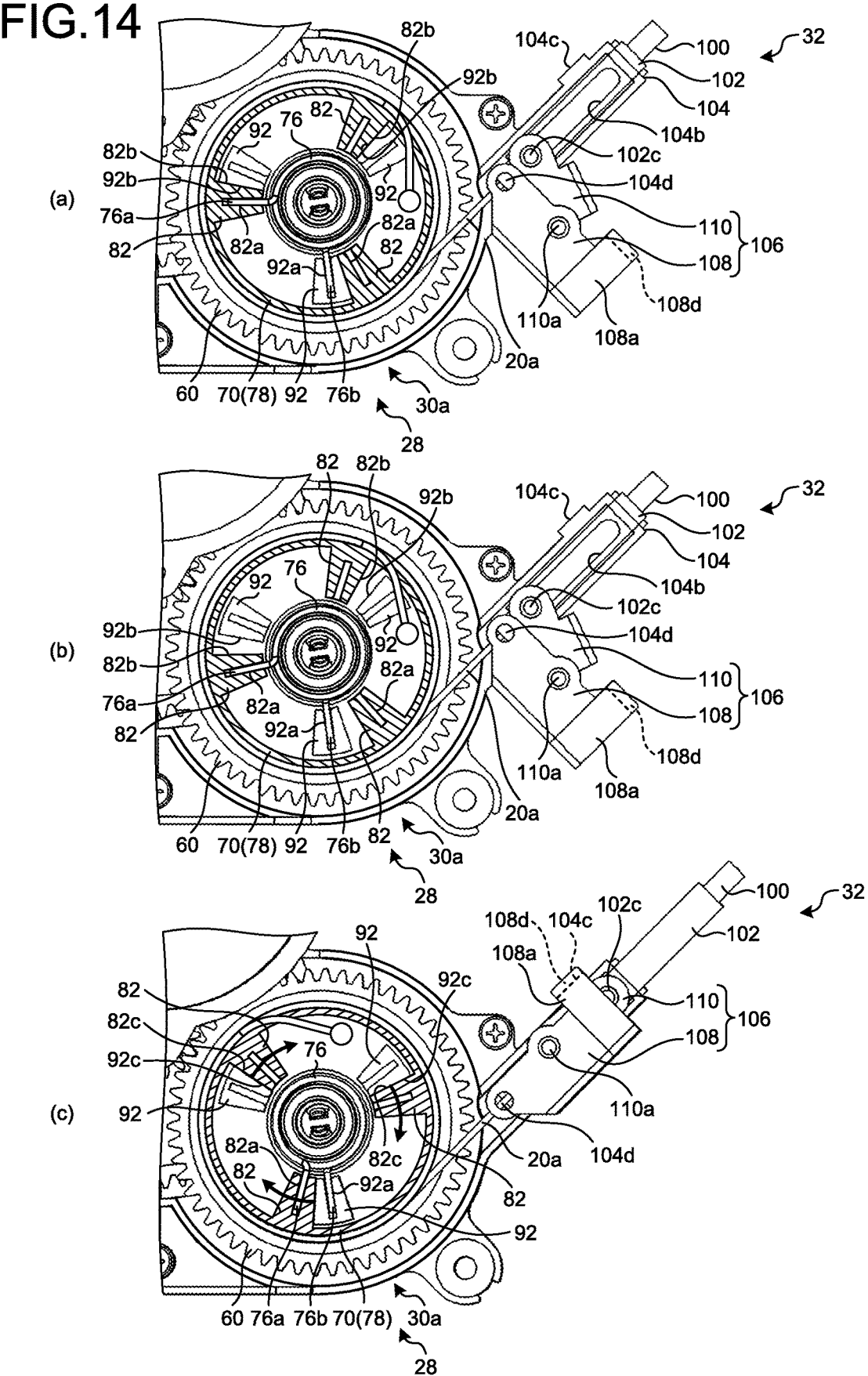
FIG. 14 is a partially cross-sectional back view of the opening drum mechanism and its periphery: part (a) of which illustrates a state before the cable path length is adjusted, part (b) of which illustrates a state in the middle of the cable path-length adjustment, and part (c) of which illustrates a state after the cable path-length is adjusted.

In the initial state, as illustrated in FIG. 13 and part (a) of FIG. 14, the path-length adjustment mechanism 32 causes the first link 108 to face obliquely downward as much as possible within the rotatable range. Thus, the second link 110 is also pulled downward, and the circular projection 102c engaged with the pivot hole 110c is shifted to the neighborhood of the lower end of the elongated opening 104b at a maximum. Here, the circular projection 102c and the circular projection 104d are located considerably close to each other, and accordingly the cable guide 102 is pulled obliquely downward. Most of the cable guide 102 is retracted into the guide unit 104, and the upper end surface slightly protrudes from the ring 104a.

As the opening cable 20a is pulled in a winding direction due to an elastic action of the torsion spring 76 in the opening drum 70, the opening cable 20a and the outer casing 100 are also retracted into the guide unit 104 together with the cable guide 102. The length of the opening cable 20a and the outer casing 100 exposed on the outside through the ring 104a is short as it is retracted into the guide unit 104.

The opening drum 70 is elastically biased by the torsion spring 76 in a clockwise direction in part (a) of FIG. 14 so that clockwise-direction surfaces 82b of the three rotation stoppers 82 in the opening drum 70 abut counterclockwise-direction surfaces 92b of the three rotation stoppers 92 in the opening second output-side gear 60, respectively.

Figure 15:
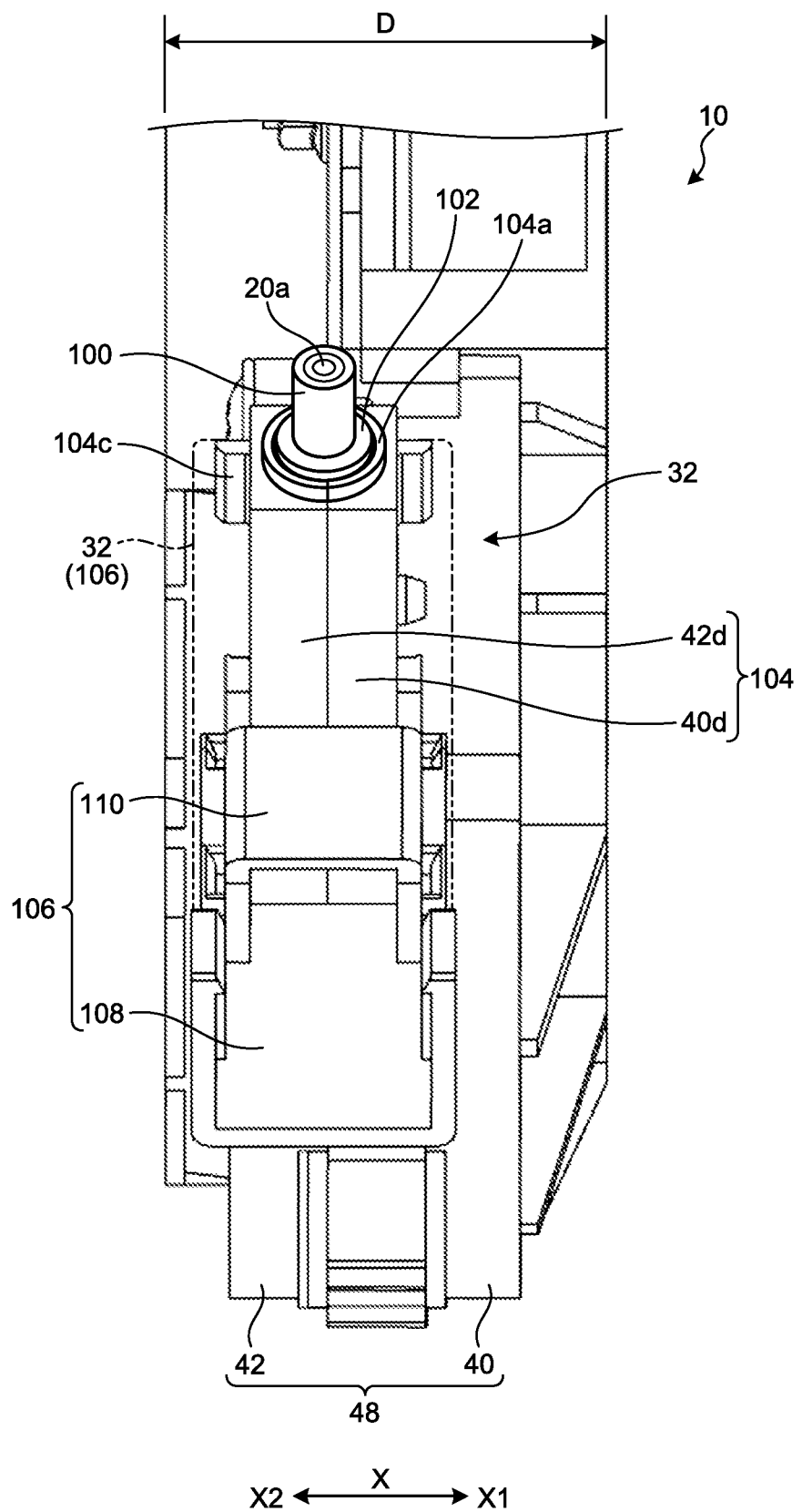
FIG. 15 is a side view of the path-length adjustment mechanism before the cable path length is adjusted.

Furthermore, as illustrated in FIG. 15, the path-length adjustment mechanism 32 fits within the width of the sliding-door drive device 10 at this point, and, more specifically, has a width of approximately 1/2 of the total width of the first housing 40 and the second housing 42.

In this state, the sliding-door drive device 10 is fixed to a predetermined position in the vehicle 12, and the other end of the opening cable 20a is fixedly wired to the door 14. As the opening cable 20a is wound around the opening drum 70 elastically to a certain degree due to the torsion spring 76, it is pulled out against the elastic force so that the opening cable 20a can be temporarily extended to some extent to make allowance and easily wired to the door 14. Furthermore, due to a rotational restriction action of the rotation stopper 82 and the rotation stopper 92, the opening cable 20a is prevented from being excessively pulled out, and the outer casing 100 is prevented from being released from the cable guide 102. After the opening cable 20a has been completely wired and fixed to the door 14, the opening cable 20a is moderately wound due to the torsion spring 76; however the opening drum 70 has been slightly rotated in a counterclockwise direction as compared to the initial state and the clockwise-direction surface 82b of the rotation stopper 82 is separated from the counterclockwise-direction surface 92b of the rotation stopper 92, as illustrated in part (b) of FIG. 14.

Furthermore, the link 106 of the path-length adjustment mechanism 32 is operated such that the cable path length of the opening cable 20a is increased. Specifically, the first link 108 is rotated in a counterclockwise direction in FIG. 13 so that the second link 110 and the cable guide 102 are lifted up. The link 106 is manually operated in an easy way.

Figure 16:
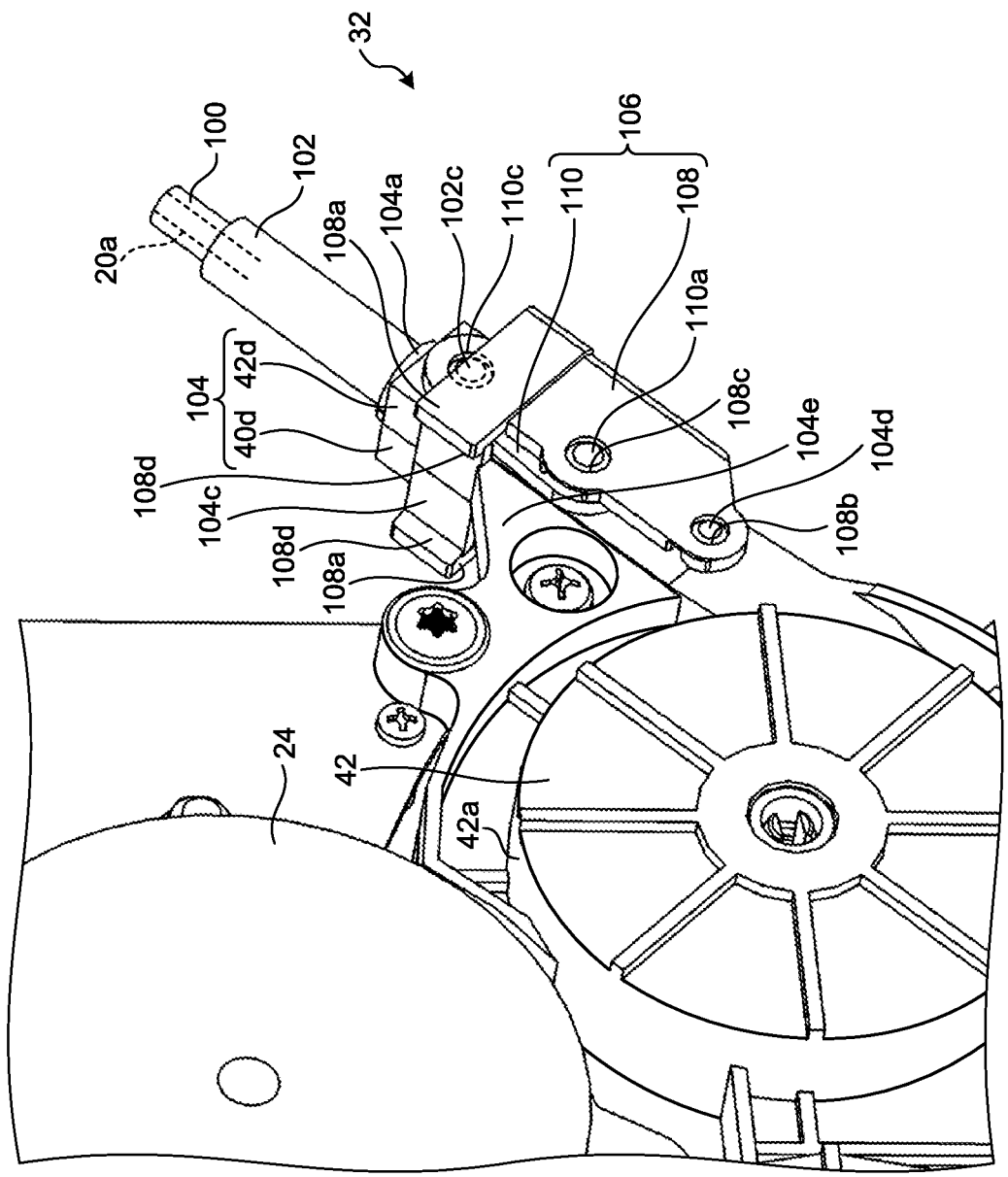
FIG. 16 is a perspective view of the path-length adjustment mechanism after the cable length is adjusted.

As illustrated in FIG. 16, when the first link 108 is sufficiently rotated, the claw 108d at the end of the engaging projection 108a is engaged with the engagement piece 104c. Here, since the initially contacted surfaces of the claw 108d and the engagement piece 104c are slope surfaces, the claw 108d can be smoothly engaged with the engagement piece 104c. The claw 108d is elastically pushed outward to a certain degree once, and is instantly engaged due to an elastic action after going beyond the widest part of the engagement piece 104c, whereby an operator can confirm a proper engagement by obtaining an appropriate feeling of click and clicking sound. The inner bottom surface of the second link 110 is brought into contact with the lower slope surface of the guide unit 104, and the inner bottom surface of the first link 108 is brought into contact with the outer side surface of the second link 110 to be stable.

When the link 106 is fixed due to engagement between the claw 108d and the engagement piece 104c, the circular projection 102c, the circular projection 110a, and the circular projection 104d are arranged on a line, the distance between the circular projection 102c and the circular projection 104d is longest within the movable range of the link 106, and the circular projection 102c is lifted up to the vicinity of the upper end of the elongated opening 104b. Accordingly, the cable guide 102 and the outer casing 100 are also projected obliquely upward, and the opening cable 20a, inserted through the outer casing 100, is also pushed out against the elastic force of the torsion spring 76 together with the outer casing 100.

That is, the cable guide 102, the outer casing 100, and the opening cable 20a are fixed such that the path length has been increased by the distance in which the circular projection 102c has moved along the elongated opening 104b with the upper end portion of the guide unit 104 as a reference.

As illustrated in part (c) of FIG. 14, the opening drum 70 is rotated corresponding to unwinding of the opening cable 20a in a counterclockwise direction of part (c) of FIG. 14, and accordingly counterclockwise-direction surfaces 82c of the three rotation stopper 82 just abut clockwise-direction surfaces 92c of the three rotation stopper 92. The counterclockwise-direction surface 82c and the clockwise-direction surface 92c can be slightly separated within a predetermined tolerance range or can be gently pressed. Thus, when the path length of the opening cable 20a has a length to remove looseness, the position of the end portion of the outer casing 100 is fixed.

During a subsequent operation of the sliding-door drive device 10, when the opening second output-side gear 60 is rotated in a clockwise direction as indicated by the arrow in the drawing to wind the opening cable 20a, the rotation stoppers 82 and the rotation stoppers 92 in three pairs directly transmit rotation of the opening second output-side gear 60 to the opening cable 20a. Furthermore, when the opening cable 20a is wound, the force of the opening second output-side gear 60 is transmitted to the rotation stopper 92, the rotation stopper 82, the opening drum 70, the opening cable 20a, and the door 14, and as there are no areas that elastically change or no substantial spaces between them and there is a rigid connection, the force is directly transmitted and a control is performed in a preferred manner. Furthermore, when the opening cable 20a is unwound, the opening second output-side gear 60 is rotated in a counterclockwise direction and therefore the force is not transmitted from the rotation stopper 92 to the rotation stopper 82; however, as the opening cable 20a is pulled by the door 14, the opening drum 70 is also rotated in a counterclockwise direction and, as a result, the opening second output-side gear 60 and the opening drum 70 are rotated in synchronization.

Furthermore, as illustrated by a virtual line in FIG. 15, the link 106 of the path-length adjustment mechanism 32 fits within the width of the sliding-door drive device 10 at this point. That is, as the axis of the joint part of the link 106 is set in the X direction, the width of the link 106, when viewed from the side, is the same before and after the cable length is adjusted, has a specification to be thin so as to fit within the width of the sliding-door drive device 10, and does not protrude in the X1 direction or the X2 direction, whereby the link 106 can be installed in a narrow area in the vehicle 12.

With the path-length adjustment mechanism 32 that is capable of changing the path length, the number of components and the weight can be reduced as compared with the type that presses a cable in a horizontal direction by using a tension pulley or the like. Furthermore, there is no need to provide spaces for a tension pulley or the like, and allowance areas for its operation. As the path-length adjustment mechanism 32 is operated in the end of the outer casing 100, the path length can be easily changed.

As described above, in the sliding-door drive device 10 according to the present embodiment, the rotation axes of the motor 24, the opening drum 70, and the closing drum 72 are parallel, and the opening drum 70 and the closing drum 72 are arranged parallel. With this parallel arrangement, the opening drum 70 and the closing drum 72 do not have wasted spaces for winding the opening cable 20a and the closing cable 20b, the X-direction lengths of the opening drum mechanism 30a and the closing drum mechanism 30b are accordingly reduced, and the thickness is reduced as a whole. Furthermore, as the thickness of the sliding-door drive device 10 is reduced, there is an improvement in a reduction in weight and flexibility for vehicle layout including an interior width.

Furthermore, in the sliding-door drive device 10, the path-length adjustment mechanism 32 moves the end portion of the outer casing 100 at the side close to the opening drum 70 in an extending direction of the opening cable 20a and adjusts the path length of the opening cable 20a. Thus, the number of components and the weight can be reduced as compared with the type that presses a cable in a horizontal direction by using a tension pulley or the like.

Furthermore, there is no need to provide spaces for a tension pulley or the like, and allowance areas for its operation. As a tension pulley is not needed, no bending load is applied to the opening cable 20a. Furthermore, as the path-length adjustment mechanism 32 is operated in the end portion of the outer casing 100, the path length can be easily adjusted. With the engagement piece 104c and the claw 108d as the path-length fixing unit, the outer casing 100 can be fixed at an appropriate position. Furthermore, after the end portion of the outer casing 100 is fixed at an appropriate position by the path-length fixing unit, the speed reducing mechanism 28, the opening drum 70, the opening cable 20a, and the door 14 are rigidly connected in a winding direction of the opening cable 20a. Thus, due to a rigid connection without any elastically changed areas, forces are directly transmitted and preferred control is performed. As the path-length adjustment mechanism 32 fits within the width of the unit before and after operation, it is sufficient to have a narrow housing section for installing the sliding-door drive device 10 in the vehicle 12, and accordingly a wider interior width is obtained.

In the above-described example, the sliding-door drive device 10 is applied to the left side of the vehicle 12; however, it is also applicable to the right side when the opening/closing function is reversed by rewriting programs, changing right/left switches appropriately or the like. Although it is preferable that the thin and compact sliding-door drive device 10 be installed in the center rail 16b, it may be installed in the upper rail 16a or the lower rail 16c depending on a design condition. The sliding-door drive device 10 is not limited to opening/closing of the door 14 on the rear side but may be applied to, for example, door opening/closing of two-door vehicles.

The present invention is not limited to the above-described embodiment, and it is obvious that modifications may be made in a flexible manner without departing from the scope of the present invention.

REFERENCE SIGNS LIST

10 SLIDING-DOOR DRIVE DEVICE
14 DOOR
20a OPENING CABLE
20b CLOSING CABLE
22 BASE PLATE
24 MOTOR
26 ECU
28 SPEED REDUCING MECHANISM
30a OPENING DRUM MECHANISM
30b CLOSING DRUM MECHANISM
32 PATH-LENGTH ADJUSTMENT MECHANISM

38 OUTPUT SHAFT
40 FIRST HOUSING
42 SECOND HOUSING
48 MODULE (HOUSING)
50 FIRST-STAGE SPEED REDUCING UNIT
52 SECOND-STAGE SPEED REDUCING UNIT
54 FIRST INPUT-SIDE GEAR
56 FIRST OUTPUT-SIDE GEAR
58 SECOND INPUT-SIDE GEAR
60 OPENING SECOND OUTPUT-SIDE GEAR
62 CLOSING SECOND OUTPUT-SIDE GEAR
64 INTERMEDIATE SHAFT
70 OPENING DRUM
72 CLOSING DRUM
74 GEAR INTEGRAL UNIT
76 TORSION SPRING (ELASTIC WINDING UNIT)
78 DRUM
80 HELICAL GROOVE
82, 92 ROTATION STOPPER
100 OUTER CASING
102 CABLE GUIDE
104 GUIDE UNIT
104c ENGAGEMENT PIECE (ENGAGED UNIT, PATH-LENGTH FIXING UNIT)
106 LINK
108 FIRST LINK
108d CLAW (ENGAGING UNIT, PATH-LENGTH FIXING UNIT)
110 SECOND LINK

The invention claimed is:

1. A sliding-door drive device comprising:
a motor;
a speed reducing mechanism configured to reduce rotation of the motor;
opening and closing cables having respective one ends secured to a sliding door of a vehicle;
an opening drum, having the opening cable wound therearound, configured to be rotated by the motor through the speed reducing mechanism; and
a closing drum, having the closing cable wound therearound, configured to be rotated by the motor through the speed reducing mechanism, wherein
rotation axes of the motor, the opening drum, and the closing drum are parallel, and
the opening drum and the closing drum are arranged parallel in radial directions thereof.

2. The sliding-door drive device according to claim 1, further comprising:
a housing configured to house the speed reducing mechanism, the opening drum, and the closing drum, wherein
an Electronic Control Unit (ECU) including a control circuit for the motor is integrally arranged with the motor and the housing,
the ECU is provided such that at least a part thereof is overlapped with the motor when viewed in an axial direction of the rotation axes, and
a width of the housing in the axial direction of the rotation axes is configured to be less than a width from an outer end surface of the ECU to an outer end surface of the motor.

3. The sliding-door drive device according to claim 2, wherein, an end surface of the ECU and an end surface of the housing are disposed on an identical plane at one end in the axial direction of the rotation axes, and an end surface of the motor and an end surface of the housing are on an identical plane at other end.

4. The sliding-door drive device according to claim 1, wherein the width in the axial direction of the rotation axes is 45 to 59 mm.

5. The sliding-door drive device according to claim 1, wherein the motor is of a brushless type and has a flat shape where a ratio of a diameter/an axial-direction thickness is 4.45 to 4.70.

6. The sliding-door drive device according to claim 1, wherein
the speed reducing mechanism includes a first-stage speed reducing unit and a second-stage speed reducing unit,
the first-stage speed reducing unit includes
a first input-side gear that is an external gear provided on an output shaft of the motor; and
a first output-side gear that is an external gear configured to be engaged with the first input-side gear,
the second-stage speed reducing unit includes
a second input-side gear that is an external gear being integral and coaxial with the first output-side gear; and
an opening second output-side gear and a closing second output-side gear that are external gears each being engaged with the second input-side gear,
the output shaft and the first input-side gear protrude from the motor in a first direction,
the second input-side gear is provided in a second direction opposite to the first direction with respect to the first output-side gear,
the opening drum is provided on a side in the second direction and being coaxial to the opening second output-side gear, and
the closing drum is provided on a side in the second direction and being coaxial with the closing second output-side gear.

7. The sliding-door drive device according to claim 6, wherein the first-stage speed reducing unit and the second-stage speed reducing unit have an identical speed reduction ratio.

8. The sliding-door drive device according to claim 6, wherein, when viewed in the axial direction of the rotation axes, a shaft center of the first output-side gear and a shaft center of the second input-side gear are provided at a circumcenter position of a triangle that has three vertices at a shaft center of the first input-side gear, a shaft center of the opening second output-side gear, and a shaft center of the closing second output-side gear.

9. The sliding-door drive device according to claim 6, wherein the ECU controlling the motor is provided on a side in the first direction with respect to the motor.

10. The sliding-door drive device according to claim 6, wherein the first input-side gear is made of a copper-iron based sintered material, and the first output-side gear and the second input-side gear are made of a resin material.

* * * * *